United States Patent
Liu

(10) Patent No.: US 11,968,738 B2
(45) Date of Patent: Apr. 23, 2024

(54) DISCONTINUOUS RECEPTION METHOD AND APPARATUS, AND SYSTEM

(71) Applicant: HUAWEI TECHNOLOGIES CO., LTD., Shenzhen (CN)

(72) Inventor: Dongsheng Liu, Shanghai (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 344 days.

(21) Appl. No.: 17/519,767

(22) Filed: Nov. 5, 2021

(65) Prior Publication Data
US 2022/0061123 A1 Feb. 24, 2022

Related U.S. Application Data

(63) Continuation of application No. PCT/CN2019/086006, filed on May 8, 2019.

(51) Int. Cl.
*H04W 76/28* (2018.01)
*H04B 7/08* (2006.01)

(52) U.S. Cl.
CPC ............. *H04W 76/28* (2018.02); *H04B 7/08* (2013.01)

(58) Field of Classification Search
None
See application file for complete search history.

(56) References Cited

U.S. PATENT DOCUMENTS

| | | |
|---|---|---|
| 2013/0331081 A1 | 12/2013 | Rune et al. |
| 2018/0288737 A1 | 10/2018 | Islam |
| 2019/0045481 A1* | 2/2019 | Sang ...................... H04B 1/713 |
| 2019/0053320 A1 | 2/2019 | Islam et al. |
| 2019/0098520 A1 | 3/2019 | Kim |

(Continued)

FOREIGN PATENT DOCUMENTS

| | | |
|---|---|---|
| CN | 102740429 A | 10/2012 |
| CN | 103596632 A | 2/2014 |
| CN | 104350795 A | 2/2015 |

(Continued)

OTHER PUBLICATIONS

3GPP TSG-RAN WG2 Meeting #97., "C-DRX Beam Management Aspects", InterDigital Communications, Athens, Greece, Feb. 13-17, 2017, R2-1701187; 3 pages.

(Continued)

*Primary Examiner* — Hong Shao
(74) *Attorney, Agent, or Firm* — Maier & Maier, PLLC

(57) ABSTRACT

A discontinuous reception apparatus for a terminal, where discontinuous reception includes a sleep period and an active period that are of the terminal and that are indicated by a network. The apparatus includes: a receiving circuit configured to receive motion state information of the terminal, where the motion state information is used to indicate a motion state of the terminal; and a first processing circuit configured to determine, based on the motion state of the terminal, duration for waking up the terminal in advance, and enable the terminal to enter the active period in advance by the duration before the sleep period indicated by the network ends. The apparatus is configured to enter, based on a change in the motion state of the terminal or a change in received signal quality, the active period in advance before the sleep period indicated by the network ends.

17 Claims, 14 Drawing Sheets

(56) References Cited

U.S. PATENT DOCUMENTS

2020/0196321 A1\* 6/2020 Zhang .................. H04W 72/21
2020/0344691 A1\* 10/2020 Liu ..................... H04W 52/028

FOREIGN PATENT DOCUMENTS

CN          109511132 A      3/2019
WO        2017146535 A1     8/2017

OTHER PUBLICATIONS

VIVO, "Summary of UE power Consumption Reduction in RRM Measurements", R1-1811914, 3GPP TSG RAN WG1 Meeting #94bis, Chengdu, China, Oct. 8-12, 2018, 10 pages.

\* cited by examiner

DISCONTINUOUS RECEPTION METHOD AND APPARATUS, AND SYSTEM

CROSS-REFERENCE TO RELATED APPLICATIONS

This application is a continuation of International Application No. PCT/CN2019/086006, filed on May 8, 2019, the disclosure of which is hereby incorporated by reference in its entirety.

TECHNICAL FIELD

The embodiments relate to the communication field, and in particular, to a discontinuous reception method and apparatus, and a system.

BACKGROUND

With the development of mobile communication technologies, requirements for communication rates and capacity are growing. The 3$^{rd}$ generation partnership project incorporates a high frequency band into a system design in a next-generation evolved new radio (NR) system. To combat a path loss in a high frequency scenario, a beamforming technology is more frequently used to increase a gain. Because a beam has relatively strong directivity, different transmit beams of a transmit end device and different receive beams of a receive end device may separately form different beam pair links for communication, and quality of communication using different beam pair links may be different.

In the conventional technology, a terminal may determine an optimal receive beam through beam sweeping, to receive a signal. Specifically, refer to FIG. 1-1. Downlink is used as an example. A transmit beam set of a base station includes a transmit beam 1, a transmit beam 2, and a transmit beam 3. A receive beam set of a terminal includes a receive beam a, a receive beam b, and a receive beam c. The base station may sequentially transmit a signal by using the transmit beam 1 to the transmit beam 3 within a specific time interval, to cover a terminal in a specific area. The terminal may also sequentially receive, by using the receive beam a to the receive beam c within a specific time interval, the same signal repeatedly sent by using the foregoing different transmit beams, to determine an optimal receive beam from the receive beam set and determine an optimal beam pair link.

In a wireless communication process, the terminal needs to keep monitoring a physical downlink control channel (PDCCH), and then receives downlink data based on an indication message sent by a network side received by the monitored PDCCH. However, because the network side does not always send data, a manner in which the terminal keeps monitoring the PDCCH causes a waste of power of the terminal. Therefore, the 3GPP standard protocol introduces a discontinuous reception (DRX) technology into a long term evolution (LTE) system. In the discontinuous reception technology, the terminal may periodically enter an active period and a sleep period, and can only perform beam sweeping or receive a signal in the active period, thereby reducing power consumption. When a position of the terminal changes (for example, rotates or horizontally moves), receiving a signal by using a previously determined optimal receive beam may cause a receiving failure.

SUMMARY

Embodiments provide a discontinuous reception solution, including a discontinuous reception method and apparatus, and a system, in order that a terminal enter, based on a change in a motion state of a terminal or a change in received signal quality, an active period in advance before a sleep period indicated by a network ends.

It should be understood that the method in the embodiments may be performed by a communication apparatus. The communication apparatus may be an entire computing device, or may be some components in the computing device, for example, a chip related to a wireless communication function, such as a system chip or a microprocessor (MCU). The system chip is also referred to as a system on chip, or is referred to as a SoC chip. The system chip may include a baseband processing chip, and the baseband processing chip is also referred to as a modem or a baseband processor sometimes. The microprocessor may also be referred to as a coprocessor, referred to as a low-power microprocessor, or referred to as a microprocessing unit, or may refer to a sensor hub in the embodiments. During physical implementation, the microprocessor may be integrated into the SoC chip, or may not be integrated into the SoC chip.

According to a first aspect, an embodiment provides a discontinuous reception apparatus for a terminal, where discontinuous reception includes a sleep period and an active period that are of the terminal and that are indicated by a network. The apparatus includes:

a receiving unit configured to receive motion state information of the terminal, where the motion state information is used to indicate a motion state of the terminal; and a first processing unit configured to determine, based on the motion state of the terminal, duration for waking up the terminal in advance, and enable the terminal to enter the active period in advance by the duration before the sleep period indicated by the network ends.

It should be understood that the apparatus may be a microprocessor or a SoC chip. For the microprocessor, the receiving unit is an input/output interface (for example, a chip pin of the microprocessor) of the microprocessor, and the first processing unit is a processor of the microprocessor. For the SoC chip, the receiving unit refers to an input/output interface of the SoC chip, and the first processing unit is a microprocessor in the SoC chip.

It should be understood that, whether the terminal needs to be woken up in advance is determined based on the motion state of the terminal. This reserves more preparation time, and reduces a probability of missing a paging message or failing to receive a paging message.

With reference to the solution provided in the first aspect, in a possible implementation, the apparatus further includes:

a second processing unit, configured to re-determine an optimal receive beam within the duration by which the terminal enters the active period in advance, where the optimal receive beam is used to receive a paging message.

It should be understood that, when the motion state changes, if the terminal receives the paging message by using an optimal receive beam previously determined by the terminal, signal quality of a corresponding received signal may be poor. This may cause a failure in receiving the paging message. After the terminal enters the active period, the optimal receive beam of the terminal is re-determined, and a paging signal is received by using the re-determined optimal receive beam, so that corresponding signal quality is the best. This reduces a risk of a failure in receiving the paging message.

With reference to any one of the first aspect or the foregoing possible implementations of the first aspect, in a possible implementation, the second processing unit is further configured to re-determine, within the duration by which the terminal enters the active period in advance, the optimal receive beam from receive beams adjacent to an optimal receive beam previously determined by the terminal.

It should be understood that, if the motion state of the terminal changes slightly, the optimal receive beam may be re-determined from the receive beams adjacent to the previously determined optimal receive beam. This reduces time for determining the optimal receive beam and reduces power consumption.

In another possible implementation, the second processing unit is further configured to re-determine the optimal receive beam from all receive beams of the terminal within the duration by which the terminal enters the active period in advance.

It should be understood that, according to the foregoing solution, the optimal receive beam can be more accurately found, and receive quality or a receive success rate of the paging signal can be improved.

With reference to any one of the first aspect or the foregoing possible implementations of the first aspect, in a possible implementation, when the terminal is in a first motion state, the duration for waking up the terminal in advance is determined as first duration; or when the terminal is in a second motion state, the duration for waking up the terminal in advance is determined as second duration.

The first duration is different from the second duration.

It should be understood that the first processing unit may determine, based on the motion state of the terminal, the duration for entering the active period in advance, and further set a timer to wake up the terminal in advance. The timer may be a software timer, a hardware timer, or may be a timer combining software and hardware. For example, if the first duration is 60 ms, a built-in hardware timer is selected, where duration of the hardware timer is 20 ms. A counter is set in software code, where an initial value of the counter is 3, and each time the hardware timer prompts 20 ms, the counter decreases by 1. When the counter becomes 0, it is considered that the first duration is reached, and the terminal is woken up to enter the active period.

It should be understood that different duration for entering the active period in advance is determined based on different motion states of the terminal. For example, if the motion state of the terminal changes greatly, the terminal may enter the active period earlier, to re-determine the optimal receive beam or re-configure a circuit. According to the foregoing solution, different duration for entering the active period in advance is adaptively selected based on different motion states of the terminal. This can improve receive quality or a receive success rate of the paging signal, and reduce power consumption.

With reference to any one of the first aspect or the foregoing possible implementations of the first aspect, in a possible implementation, the motion state information is from a sensor coupled to the receiving unit.

It should be understood that the motion state information may be sensing information obtained by the sensor through measurement. For example, a rotation angle obtained by a gyroscope through measurement. The first processing unit may determine the motion state of the terminal based on the foregoing information.

Alternatively, the motion state information may be indication information obtained by the sensor through further calculation based on motion state information of the terminal obtained through measurement, and the indication information may be used to indicate the motion state of the terminal. For example, a high level indicates a first motion state, a low level indicates a second motion state, and a zero level indicates that the motion state does not change.

With reference to any one of the first aspect or the foregoing possible implementations of the first aspect, in a possible implementation, the first processing unit is the microprocessor, and the first processing unit is still in a working state when the terminal enters the sleep period of discontinuous reception.

With reference to any one of the first aspect or the foregoing possible implementations of the first aspect, in a possible implementation, the second processing unit is a baseband processor, and the second processing unit enters a sleep state when the terminal enters the sleep period of discontinuous reception.

It should be understood that, when the terminal enters the sleep period of discontinuous reception, the baseband processor enters the sleep state, in other words, the baseband processor is not in a working state, to reduce power consumption. With reference to any one of the first aspect or the foregoing possible implementations of the first aspect, in a possible implementation, the second processing unit is further configured to determine, based on discontinuous reception configuration information (discontinuous reception configuration information) delivered by the network, the sleep period and the active period that are of the terminal and that are indicated by the network.

It should be understood that the discontinuous reception configuration information may be carried by a physical downlink control channel (PDCCH), and the terminal may be in a connected mode.

With reference to any one of the first aspect or the foregoing possible implementations of the first aspect, in a possible implementation, the second processing unit is further configured to determine, based on a system information block delivered by the network, the sleep period and the active period that are of the terminal and that are indicated by the network.

It should be understood that the system information block may be carried by a physical broadcast channel (PBCH), and the terminal may be in an idle mode.

According to a second aspect, an embodiment provides a discontinuous reception apparatus for a terminal. The apparatus includes:

a first reading unit, configured to read historical signal quality information of the terminal; and a first processing unit, configured to determine, based on the historical signal quality information of the terminal, duration for waking up the terminal in advance, and enable the terminal to enter an active period in advance by the duration before a sleep period indicated by a network ends.

It should be understood that the apparatus may be a microprocessor or a SoC chip. The first reading unit may be configured to read received signal quality information of the terminal from an internal or external memory of the apparatus, where the memory may be located in the SoC chip or the baseband processor. For the microprocessor, the first reading unit is an input/output interface (for example, a chip pin of the microprocessor) of the microprocessor, and the first processing unit is a processor of the microprocessor. For the SoC chip, the first reading unit is an input/output interface of the microprocessor, and the first processing unit is a microprocessor in the SoC chip. It should be understood that, whether the terminal needs to be woken up in advance is determined based on the historical signal quality of the terminal. This reserves more preparation time, and reduces a probability of missing a paging message or failing to receive a paging message.

With reference to the solution provided in the second aspect, in a possible implementation, the apparatus further includes:

a second processing unit, configured to re-determine an optimal receive beam within the duration by which the terminal enters the active period in advance, where the optimal receive beam is used to receive a paging message.

It should be understood that, when historical signal quality of the terminal is poor, it can be inferred that a current communication environment of the terminal changes. The paging signal is received by using a previously determined optimal receive beam, and corresponding signal quality may still be poor. This may cause a failure in receiving the paging message. After the terminal enters the active period, the optimal receive beam of the terminal is re-determined, and a paging signal is received by using the re-determined optimal receive beam, so that corresponding signal quality is the best. This reduces a risk of a failure in receiving the paging message.

In another possible implementation, the second processing unit is further configured to re-determine, within the duration by which the terminal enters the active period in advance, the optimal receive beam from receive beams adjacent to an optimal receive beam previously determined by the terminal.

It should be understood that the historical signal quality information of the terminal may correspond to different cases. When the historical signal quality of the terminal is very poor, the optimal receive beam may be determined from all receive beams of the terminal. When the historical signal quality of the terminal is poor or average, the optimal receive beam may be re-determined from receive beams adjacent to the optimal receive beam previously determined by the terminal. According to the foregoing solution, different duration for entering the active period in advance is adaptively selected based on different historical signal quality information of the terminal. This can improve receive quality or a receive success rate of the paging signal, and reduce power consumption.

With reference to the second aspect or the foregoing possible implementations of the second aspect, in a possible implementation, the second processing unit is further configured to re-determine the optimal receive beam from all receive beams of the terminal within the duration by which the terminal enters the active period in advance.

It should be understood that, according to the foregoing solution, the optimal receive beam can be more accurately found, and receive quality or a receive success rate of the paging signal can be improved.

It should be understood that the first processing unit may determine, based on historical received signal quality information of the terminal, the duration for entering the active period in advance, and further set a timer to wake up the terminal in advance. The timer may be a software timer, a hardware timer, or may be a timer combining software and hardware.

With reference to any one of the second aspect or the foregoing possible implementations of the second aspect, in a possible implementation, the first processing unit is the microprocessor, and the first processing unit is still in a working state when the terminal enters the sleep period of discontinuous reception.

With reference to any one of the second aspect or the foregoing possible implementations of the second aspect, in a possible implementation, the second processing unit is a baseband processor, and the second processing unit enters a sleep state when the terminal enters the sleep period of discontinuous reception.

With reference to any one of the second aspect or the foregoing possible implementations of the second aspect, in a possible implementation, the second processing unit is further configured to determine, based on discontinuous reception configuration information delivered by the network, the sleep period and the active period that are of the terminal and that are indicated by the network.

It should be understood that the discontinuous reception configuration information may be carried by a physical downlink control channel (PDCCH), and the terminal may be in a connected mode.

With reference to any one of the second aspect or the foregoing possible implementations of the second aspect, in a possible implementation, the second processing unit is further configured to determine, based on a system information block delivered by the network, the sleep period and the active period that are of the terminal and that are indicated by the network.

It should be understood that the system information block may be carried by a physical broadcast channel (PBCH), and the terminal may be in an idle mode.

According to a third aspect, an embodiment provides a discontinuous reception method, where discontinuous reception includes a sleep period and an active period that are of a terminal and that are indicated by a network. The method includes:

determining, based on a motion state of the terminal, duration for waking up the terminal in advance, and enabling the terminal to enter the active period in advance by the duration before the sleep period indicated by the network ends.

It should be understood that an apparatus for performing the foregoing steps may be a microprocessor or a SoC chip. It should be understood that, whether the terminal needs to be woken up in advance is determined based on the motion state of the terminal. This reserves more preparation time, and reduces a probability of missing a paging message or failing to receive a paging message.

With reference to the solution provided in the third aspect, in a possible implementation, the method further includes:

re-determining an optimal receive beam within the duration by which the terminal enters the active period in advance, where the optimal receive beam is used to receive a paging message.

It should be understood that, when the motion state changes, if the terminal receives the paging message by using an optimal receive beam previously determined by the terminal, signal quality of a corresponding received signal may be poor. This may cause a failure in receiving the paging message. After the terminal enters the active period, the optimal receive beam of the terminal is re-determined, and a paging signal is received by using the re-determined optimal receive beam, so that corresponding signal quality is the best. This reduces a risk of a failure in receiving the paging message.

Further, in a possible implementation, the method includes: re-determining, within the duration by which the terminal enters the active period in advance, the optimal receive beam from receive beams adjacent to an optimal receive beam previously determined by the terminal.

It should be understood that, if the motion state of the terminal changes slightly, the optimal receive beam may be re-determined from the receive beams adjacent to the previously determined optimal receive beam. This reduces time for determining the optimal receive beam and reduces power consumption.

Further, in a possible implementation, the method includes: re-determining the optimal receive beam from all receive beams of the terminal within the duration by which the terminal enters the active period in advance.

It should be understood that, according to the foregoing solution, the optimal receive beam can be more accurately found, and receive quality or a receive success rate of the paging signal can be improved.

With reference to the third aspect or the foregoing possible implementations of the third aspect, in a possible implementation, the method further includes: when the terminal is in a first motion state, determining the duration for waking up the terminal in advance as first duration.

It should be understood that the duration for entering the active period in advance may be determined based on the motion state of the terminal, and a timer may be further set to wake up the terminal in advance. The timer may be a software timer, a hardware timer, or may be a timer combining software and hardware. In another possible implementation, the method includes: when the terminal is in a second motion state, determining the duration for waking up the terminal in advance as second duration. The second duration is different from the first duration.

It should be understood that different duration for entering the active period in advance is determined based on different motion states of the terminal. For example, if the motion state of the terminal changes greatly, the terminal may enter the active period earlier, to re-determine the optimal receive beam or re-configure a circuit. According to the foregoing solution, different duration for entering the active period in advance is adaptively selected based on different motion states of the terminal. This can improve receive quality or a receive success rate of the paging signal, and reduce power consumption.

With reference to any one of the third aspect or the foregoing possible implementations of the third aspect, in a possible implementation, motion state information is received by using a sensor.

It should be understood that sensing information of the sensor may be motion state information of the terminal obtained by the sensor through measurement, for example, a rotation angle obtained by a gyroscope through measurement. The first processing unit may determine the motion state of the terminal based on the foregoing information.

Alternatively, the motion state information may be indication information obtained by the sensor through further calculation based on motion state information of the terminal obtained through measurement, and the indication information may be used to indicate the motion state of the terminal. For example, a high level indicates a first motion state, a low level indicates a second motion state, and a zero level indicates that the motion state does not change.

With reference to the third aspect, the method includes: determining, based on discontinuous reception configuration information delivered by the network, the sleep period and the active period that are of the terminal and that are indicated by the network.

It should be understood that the discontinuous reception configuration information may be carried by a physical downlink control channel (PDCCH), and the terminal may be in a connected mode.

With reference to the third aspect or any one of the foregoing possible implementations of the third aspect, in a possible implementation, the second processing unit is further configured to determine, based on a system information block delivered by the network, the sleep period and the active period that are of the terminal and that are indicated by the network.

It should be understood that the system information block may be carried by a physical broadcast channel (PBCH), and the terminal may be in an idle mode.

According to a fourth aspect, an embodiment provides a discontinuous reception method. The method includes:
    reading historical signal quality information of a terminal; and
    determining, based on the historical signal quality information of the terminal, duration for waking up the terminal in advance, and enable the terminal to enter an active period in advance by the duration before a sleep period indicated by a network ends.

It should be understood that an apparatus for performing the foregoing steps may be a microprocessor or a SoC chip. It should be understood that, whether the terminal needs to be woken up in advance is determined based on the historical signal quality of the terminal. This reserves more preparation time, and reduces a probability of missing a paging message or failing to receive a paging message.

With reference to the solution provided in the fourth aspect, in a possible implementation, the method further includes:
    re-determining an optimal receive beam within the duration by which the terminal enters the active period in advance, where the optimal receive beam is used to receive a paging message.

It should be understood that, when historical signal quality of the terminal is poor, it can be inferred that a current communication environment of the terminal changes. The paging signal is received by using a previously determined optimal receive beam, and corresponding signal quality may still be poor. This may cause a failure in receiving the paging message. After the terminal enters the active period, the optimal receive beam of the terminal is re-determined, and a paging signal is received by using the re-determined optimal receive beam, so that corresponding signal quality is the best. This reduces a risk of a failure in receiving the paging message.

In another possible implementation, the method includes: re-determining, within the duration by which the terminal enters the active period in advance, the optimal receive beam from receive beams adjacent to an optimal receive beam previously determined by the terminal.

It should be understood that the historical signal quality information of the terminal may correspond to different cases. When the historical signal quality of the terminal is very poor, the optimal receive beam may be determined from all receive beams of the terminal. When the historical signal quality of the terminal is poor or average, the optimal receive beam may be re-determined from receive beams adjacent to the optimal receive beam previously determined by the terminal. According to the foregoing solution, different duration for entering the active period in advance is adaptively selected based on different historical signal quality information of the terminal. This can improve receive quality or a receive success rate of the paging signal, and reduce power consumption.

With reference to the fourth aspect or the foregoing possible implementations of the fourth aspect, in a possible implementation, the method includes: re-determining the optimal receive beam from all receive beams of the terminal within the duration by which the terminal enters the active period in advance.

It should be understood that, according to the foregoing solution, the optimal receive beam can be more accurately found, and receive quality or a receive success rate of the paging signal can be improved.

It should be understood that the duration for entering the active period in advance may be further determined based on the historical signal quality information of the terminal, and a timer may be further set to wake up the terminal in advance. The timer may be a software timer, a hardware timer, or may be a timer combining software and hardware.

With reference to any one of the fourth aspect or the foregoing possible implementations of the fourth aspect, in a possible implementation, the method further includes: determining, based on discontinuous reception configuration information delivered by the network, the sleep period and the active period that are of the terminal and that are indicated by the network.

It should be understood that the discontinuous reception configuration information may be carried by a physical downlink control channel (PDCCH), and the terminal may be in a connected mode.

With reference to any one of the fourth aspect or the foregoing possible implementations of the fourth aspect, in a possible implementation, the method further includes: determining, based on a system information block delivered by the network, the sleep period and the active period that are of the terminal and that are indicated by the network.

It should be understood that the system information block may be carried by a physical broadcast channel (PBCH), and the terminal may be in an idle mode.

According to a fifth aspect, a terminal is provided. The terminal includes:
- a baseband processor, configured to determine, based on a message from a network, a sleep period and an active period that are of the terminal and that are indicated by the network;
- a sensor, configured to obtain motion state information of the terminal, where the motion state information is used to indicate a motion state of the terminal; and
- a microprocessor coupled to the sensor and the baseband processor, configured to determine, based on the motion state of the terminal, duration for waking up the terminal in advance, and enable the terminal to enter the active period in advance by the duration before the sleep period indicated by the network ends, where the microprocessor is still in a working state when the terminal enters the sleep period of discontinuous reception.

It should be understood that, whether the terminal needs to be woken up in advance is determined based on the motion state of the terminal. This reserves more preparation time, and reduces a probability of missing a paging message or failing to receive a paging message.

It should be understood that sensing information of the sensor may be motion state information of the terminal obtained by the sensor through measurement, for example, a rotation angle obtained by a gyroscope through measurement. The microprocessor may determine the motion state of the terminal based on the foregoing information.

Alternatively, the motion state information may be indication information obtained by the sensor through further calculation based on motion state information of the terminal obtained through measurement, and the indication information may be used to indicate the motion state of the terminal. For example, a high level indicates a first motion state, a low level indicates a second motion state, and a zero level indicates that the motion state does not change.

With reference to the solution provided in the fifth aspect, in a possible implementation, the baseband processor is further configured to re-determine an optimal receive beam within the duration by which the terminal enters the active period in advance, where the optimal receive beam is used to receive a paging message. The baseband processor enters a sleep state when the terminal enters the sleep period of discontinuous reception.

It should be understood that, when the motion state changes, if the terminal receives the paging message by using an optimal receive beam previously determined by the terminal, signal quality of a corresponding received signal may be poor. This may cause a failure in receiving the paging message. After the terminal enters the active period, the optimal receive beam of the terminal is re-determined, and a paging signal is received by using the re-determined optimal receive beam, so that corresponding signal quality is the best. This reduces a risk of a failure in receiving the paging message.

Further, in a possible implementation, the baseband processor is further configured to re-determine, within the duration by which the terminal enters the active period in advance, the optimal receive beam from receive beams adjacent to an optimal receive beam previously determined by the terminal.

It should be understood that, if the motion state of the terminal changes slightly, the optimal receive beam may be re-determined from the receive beams adjacent to the previously determined optimal receive beam. This reduces time for determining the optimal receive beam and reduces power consumption.

Further, in a possible implementation, the baseband processor is further configured to re-determine the optimal receive beam from all receive beams of the terminal within the duration by which the terminal enters the active period in advance.

It should be understood that, according to the foregoing solution, the optimal receive beam can be more accurately found, and receive quality or a receive success rate of the paging signal can be improved.

With reference to the fifth aspect or the foregoing possible implementations of the fifth aspect, in a possible implementation, the microprocessor is further configured to: when the terminal is in a first motion state, determine the duration for waking up the terminal in advance as first duration.

It should be understood that the microprocessor may determine, based on the motion state of the terminal, the duration for entering the active period in advance, and further set a timer to wake up the terminal in advance. The timer may be a software timer, a hardware timer, or may be a timer combining software and hardware.

In another possible implementation, the microprocessor is further configured to: when the terminal is in a second motion state, determine the duration for waking up the terminal in advance as second duration. The second duration is different from the first duration.

It should be understood that different duration for entering the active period in advance is determined based on different motion states of the terminal. For example, if the motion state of the terminal changes greatly, the terminal may enter the active period earlier, to re-determine the optimal receive beam or re-configure a circuit. According to the foregoing solution, different duration for entering the active period in advance is adaptively selected based on different motion states of the terminal. This can improve receive quality or a receive success rate of the paging signal, and reduce power consumption.

It should be understood that the discontinuous reception configuration information may be carried by a physical downlink control channel (PDCCH), and the terminal may be in a connected mode.

With reference any one of the fifth aspect or the foregoing possible implementations of the fifth aspect, in a possible implementation, the baseband processor is further configured to determine, based on discontinuous reception configuration information delivered by the network, the sleep period and the active period that are of the terminal and that are indicated by the network.

With reference any one of the fifth aspect or the foregoing possible implementations of the fifth aspect, in a possible implementation, the baseband processor is further configured to determine, based on a system information block delivered by the network, the sleep period and the active period that are of the terminal and that are indicated by the network.

It should be understood that the system information block may be carried by a physical broadcast channel (PBCH), and the terminal may be in an idle mode.

According to a sixth aspect, an embodiment provides a terminal. The terminal includes:
- a baseband processor, configured to read historical signal quality information of the terminal; and
- a microprocessor coupled to the baseband processor, configured to determine, based on the historical signal quality information of the terminal, duration for waking up the terminal in advance, and enable the terminal to enter an active period in advance by the duration before a sleep period indicated by a network ends.

It should be understood that the baseband processor may be configured to read received signal quality information of the terminal from an internal or external memory of the terminal, where the memory may be located in the baseband processor. It should be understood that, whether the terminal needs to be woken up in advance is determined based on the historical signal quality of the terminal. This reserves more preparation time, and reduces a probability of missing a paging message or failing to receive a paging message.

With reference to the solution provided in the sixth aspect, in a possible implementation, the baseband processor is further configured to re-determine an optimal receive beam within the duration by which the terminal enters the active period in advance, where the optimal receive beam is used to receive a paging message.

It should be understood that, when historical signal quality of the terminal is poor, it can be inferred that a current communication environment of the terminal changes. The paging signal is received by using a previously determined optimal receive beam, and corresponding signal quality may still be poor. This may cause a failure in receiving the paging message. After the terminal enters the active period, the optimal receive beam of the terminal is re-determined, and a paging signal is received by using the re-determined optimal receive beam, so that corresponding signal quality is the best. This reduces a risk of a failure in receiving the paging message.

In another possible implementation, the baseband processor is further configured to re-determine, within the duration by which the terminal enters the active period in advance, the optimal receive beam from receive beams adjacent to an optimal receive beam previously determined by the terminal.

It should be understood that the historical signal quality information of the terminal may correspond to different cases. When the historical signal quality of the terminal is very poor, the optimal receive beam may be determined from all receive beams of the terminal. When the historical signal quality of the terminal is poor or average, the optimal receive beam may be re-determined from receive beams adjacent to the optimal receive beam previously determined by the terminal. According to the foregoing solution, different duration for entering the active period in advance is adaptively selected based on different historical signal quality information of the terminal. This can improve receive quality or a receive success rate of the paging signal, and reduce power consumption.

With reference to the sixth aspect or the foregoing possible implementations of the sixth aspect, in a possible implementation, the baseband processor is further configured to re-determine the optimal receive beam from all receive beams of the terminal within the duration by which the terminal enters the active period in advance.

It should be understood that, according to the foregoing solution, the optimal receive beam can be more accurately found, and receive quality or a receive success rate of the paging signal can be improved.

It should be understood that the microprocessor may determine, based on the historical signal quality information of the terminal, the duration for entering the active period in advance, and further set a timer to wake up the terminal in advance. The timer may be a software timer, a hardware timer, or may be a timer combining software and hardware.

With reference to any one of the sixth aspect or the foregoing possible implementations of the sixth aspect, in a possible implementation, the microprocessor is further configured to remain in a working state when the terminal enters the sleep period of discontinuous reception.

With reference to any one of the sixth aspect or the foregoing possible implementations of the sixth aspect, in a possible implementation, the baseband processor is further configured to enter a sleep state when the terminal enters the sleep period of discontinuous reception.

With reference any one of the sixth aspect or the foregoing possible implementations of the sixth aspect, in a possible implementation, the baseband processor is further configured to determine, based on discontinuous reception configuration information delivered by the network, the sleep period and the active period that are of the terminal and that are indicated by the network.

It should be understood that the discontinuous reception configuration information may be carried by a physical downlink control channel (PDCCH), and the terminal may be in a connected mode.

With reference any one of the sixth aspect or the foregoing possible implementations of the sixth aspect, in a possible implementation, the baseband processor is further configured to determine, based on a system information block delivered by the network, the sleep period and the active period that are of the terminal and that are indicated by the network.

It should be understood that the system information block may be carried by a physical broadcast channel (PBCH), and the terminal may be in an idle mode.

According to a seventh aspect, an embodiment provides a computer-readable storage medium. The computer-readable storage medium stores program code. When the program code is executed by a processor in a terminal, the method according to the implementations of the third aspect or the fourth aspect is implemented.

According to an eighth aspect, an embodiment provides a computer program product. When program code included in the computer program product is executed by a processor in a terminal, the method according to the implementations of the third aspect or the fourth aspect is implemented.

According to a ninth aspect, an embodiment provides a communication system. The communication system includes a wireless network device, and the apparatus according to the implementations of the first aspect or the second aspect, or the terminal according to the implementations of the fifth aspect or the sixth aspect.

It should be understood that, in the solution provided in any one of the foregoing aspects or any optional implementations, a beam may be understood as a communication resource. Different transmit beams may be understood as synchronization signal blocks with different numbers transmitted by a same transmit end device, may be understood as different codebooks, or may be understood as different reference signal ports. Different receive beams may be understood as radio frequency transceiver circuits with different parameters, or different radio frequency transceiver circuits configured with different parameters (for example, phase shifter parameters), or may be understood as different spatial filters, or may be understood as different reference signal ports. Adjacent receive beams may be understood as having adjacent numbers (for example, codebook numbers or receive beam numbers), or having similar directions, or having adjacent reference signal ports.

According to the foregoing solutions, it can be understood that the embodiments have the following advantages:

Whether the terminal needs to be woken up in advance is determined based on the motion state of the terminal. This reserves more preparation time.

BRIEF DESCRIPTION OF DRAWINGS

FIG. 1-2 is a schematic diagram of paging occasions on a timeline;

FIG. 1-3 is a schematic diagram of a discontinuous reception cycle on a timeline;

FIG. 1-4 is a schematic diagram of advance wake-up duration on a timeline;

FIG. 1-5 is a schematic diagram of rotating of a terminal in a sleep period;

FIG. 1-6 is a schematic diagram of moving of a terminal in a sleep period;

FIG. 2-1 is a schematic diagram of a discontinuous reception method according to an embodiment;

FIG. 2-2 is a schematic diagram of a baseband processor and a microprocessor in a terminal;

FIG. 2-3 is a schematic diagram of a plurality of receive beams of a terminal;

FIG. 2-4 is a schematic diagram of a structure of a synchronization signal block;

FIG. 2-5 is a schematic diagram of a structure of a synchronization signal burst set;

FIG. 2-6 is a schematic diagram of a period of a primary synchronization/secondary synchronization/physical broadcast channel resource block;

FIG. 2-7 is a schematic diagram of calculating sleep duration;

FIG. 2-8 is a schematic diagram of calculating additional advance wake-up duration;

FIG. 2-9 is a schematic diagram of setting a plurality of timers;

FIG. 2-10 is a schematic diagram of determining a sleep timer;

FIG. 3 is a schematic diagram of a discontinuous reception method according to an embodiment;

FIG. 4 is a schematic diagram of an apparatus according to an embodiment;

FIG. 5 is a schematic diagram of an apparatus according to an embodiment;

FIG. 6 is a schematic diagram of a terminal according to an embodiment;

FIG. 7 is a schematic diagram of a terminal according to an embodiment; and

FIG. 8 is a schematic diagram of a communication system according to an embodiment.

DETAILED DESCRIPTION OF THE EMBODIMENTS

The following clearly and describes solutions in embodiments with reference to accompanying drawings in the embodiments. It is clear that the described embodiments are merely some, but not all, of the embodiments. All other embodiments obtained by a person of ordinary skill in the art based on the embodiments without creative efforts shall fall within the scope of the embodiments.

In the embodiments and accompanying drawings, the terms "first", "second", "third", "fourth", and the like (if existent) are intended to distinguish between similar objects but do not necessarily indicate a specific order or sequence. It should be understood that the data used in such a way are interchangeable in proper circumstances so that the embodiments described herein can be implemented in other orders than the order illustrated or described herein. Moreover, the terms "include", "have" and any other variants mean to cover the non-exclusive inclusion, for example, a process, method, system, product, or device that includes a list of steps or units is not necessarily limited to those steps or units, but may include other steps or units not expressly listed or inherent to such a process, method, system, product, or device.

Figure 1:
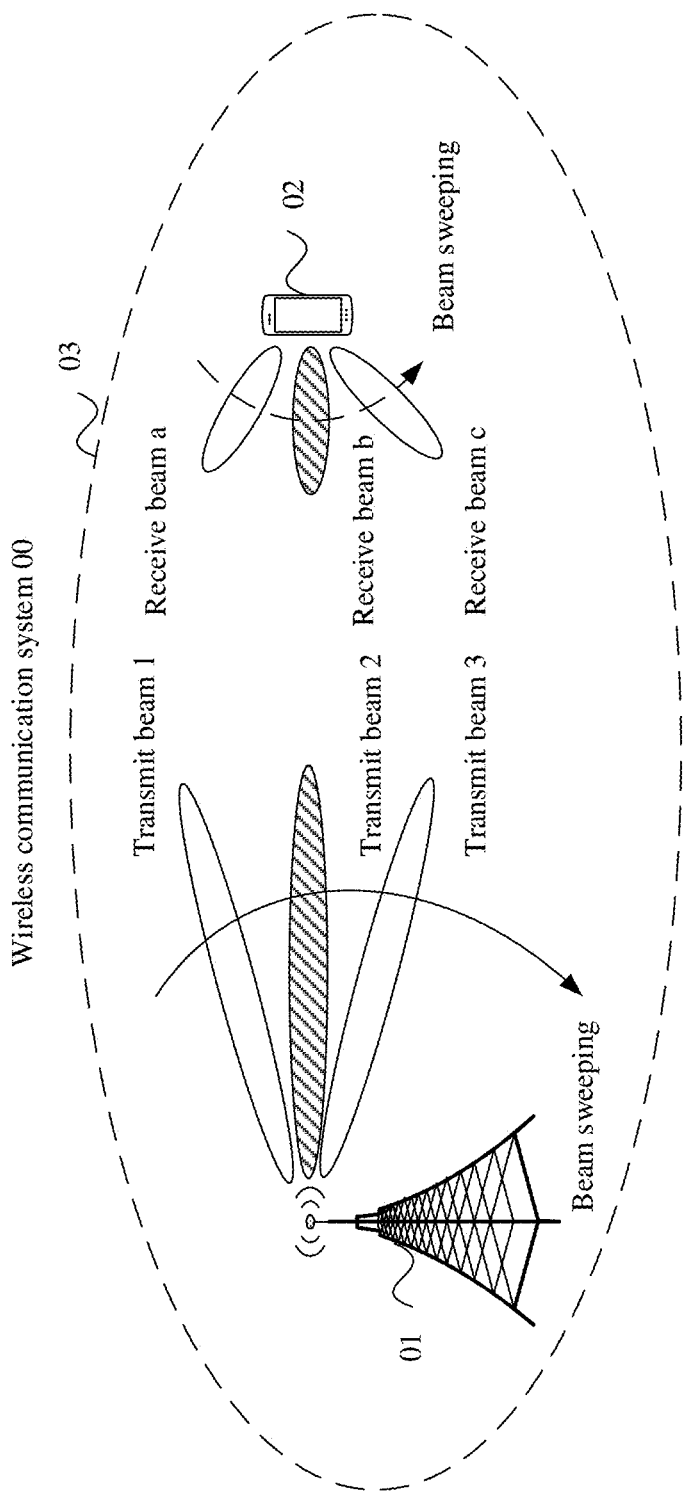
FIG. 1-1 is a schematic diagram of a wireless communication system.

As shown in FIG. 1-1, a wireless communication system 00 includes a wireless network device 01 and a terminal 02, where there may be one or more wireless network devices and terminals.

The wireless network device 01 may be an evolved NodeB (eNB), a macro base station, a micro base station (also referred to as a "small cell"), a pico base station, an access point (AP), a transmission point (TP), a gNB, or the like in an LTE system, an NR system, or a licensed-assisted access using long term evolution (LAA-LTE) system.

The terminal 02 may be a mobile station (MS), a mobile terminal, an intelligent terminal, or the like. A terminal device may communicate with one or more core networks via a radio access network (RAN). For example, the terminal device may be a mobile phone (or also referred to as a "cellular" phone), or a computer with a mobile terminal. The terminal device may alternatively be a portable, pocket-size, handheld, computer-integrated or in-vehicle mobile apparatus, and the terminal device in a future NR network, which exchanges voice and/or data with the radio access network. Description of the terminal device: in the embodiments, the terminal device may further include a relay, and any device that can perform data communication with a base station may be considered as the terminal device. A terminal in a general sense is used for description in the embodiments.

Regardless of whether the terminal is in an idle mode, a connected mode, or an inactive mode, without the foregoing discontinuous reception mechanism, the terminal keeps monitoring a downlink PDCCH message to check whether there is information from a serving cell. In most cases, the terminal does not keep exchanging valid information with a network, and does not keep performing uploading or downloading services, and voice data is not transmitted continuously during a call. In most cases, when there is no data interaction between the terminal and the network, if the terminal continuously monitors a PDCCH message, power consumption is relatively high. A discontinuous reception technology enables the terminal to periodically enter a sleep state (sleep mode) at some time. A time period in which the terminal is in the sleep state is referred to as a sleep period. The terminal does not monitor the PDCCH message in the sleep period. When the terminal needs to monitor the PDCCH message, the terminal wakes up from the sleep state, in other words, the terminal exits the sleep period. For example, a baseband processor may sleep in the sleep period and be in a non-working state. Even a corresponding radio frequency receiving channel may be in a disabled mode, and enter the working state again in an active period. In this way, the terminal can achieve an objective of power saving.

Figures 1, 2:
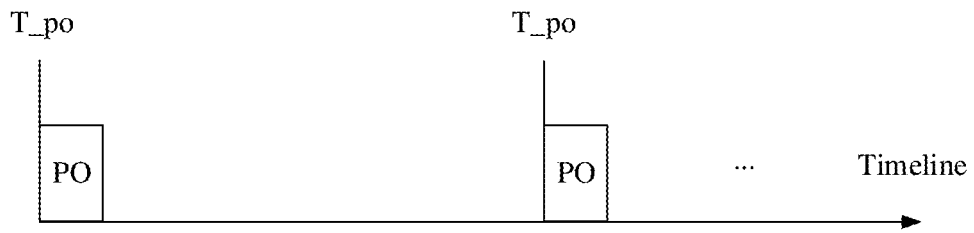
Figures 1, 2, 3:
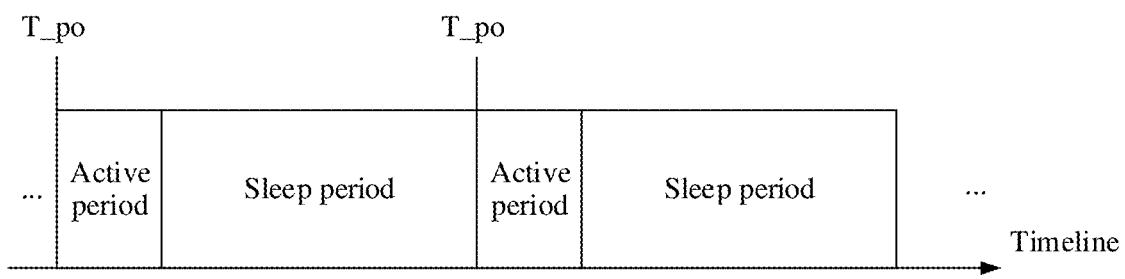

Refer to FIG. 1-2. A base station first determines a paging occasion (PO). As shown in FIG. 1-3, the base station determines a sleep period and an active period of discontinuous reception based on the PO, and sends the sleep period and the active period of discontinuous reception to a terminal. The terminal receives a downlink message from a network, where the downlink message is used to indicate the active period and the sleep period of discontinuous reception to the terminal. In some possible implementations, the downlink message is a discontinuous reception configuration message carried on a PDCCH, or the downlink message is a system information block (SIB) carried on a physical downlink control channel (PBCH). This is not limited herein. The terminal determines a time domain position of the PO and the sleep period and the active period of discontinuous reception based on the discontinuous cycle configuration message carried on the PDCCH or the system information block carried on the PBCH, and information such as an international mobile subscriber identity (IMSI).

It should be noted that the base station may determine the sleep period and the active period of discontinuous reception based on the paging occasion (PO), and send the determined sleep period and active period of discontinuous reception to a corresponding terminal. Generally, as shown in FIG. 1-4, the PO is in an active period of discontinuous reception. If T_po is a start time point corresponding to the PO, the terminal needs to enter the active period before T_po to receive a paging message sent by the base station. Specific processing duration is required for the terminal to exit a sleep period, recover a receiving circuit, and enter the active period to normally receive paging information. In other words, before T_po, the terminal further requires a specific processing period of time. This period of time is referred to as an advance wake-up period. Duration of the advance wake-up period is referred to as advance wake-up duration Ta.

Currently, before entering the sleep period, the terminal may estimate Ta based on a hardware configuration delay and a network condition, determine required sleep duration Ts based on Ta, set a timer whose duration is Ts, and then enter the sleep period. When Ts ends, the terminal exits the sleep period. It may be understood that, when the terminal is in the sleep period, currents of some circuits of the terminal are relatively low and relatively stable, and only necessary functions or components are kept, for example, a microcontroller unit (MCU) is kept in a working state, and some circuits corresponding to the baseband processor are kept in a sleep state, so that currents are low, to reduce power consumption. In a process in which the terminal enters the active period from the sleep period, currents of some circuits of the terminal may suddenly increase or gradually increase, to enable more functions, for example, enable a receiving circuit to receive a paging signal.

In the wireless communication system shown in FIG. 1-1, the wireless network device 01 may be a new generation nodeB (gNB). The gNB and the terminal form receive beams and transmit beams by using an array antenna, to implement wireless communication, so that beam directivity can be stronger, and the terminal can obtain an array gain and reduce interference. Transmit beams formed by the gNB include a transmit beam 1, a transmit beam 2, and a transmit beam 3, and transmit beams formed by the terminal include a receive beam a, a receive beam b, and a receive beam c. As shown in FIG. 1-1, the gNB and the terminal communicate by using the transmit beam 2 and the receive beam b respectively, so that signal quality for receiving a message by the terminal is good.

As shown in FIG. 1-5, if the terminal uses a receive beam b in an active period of $i^{th}$ discontinuous reception, but the terminal rotates after entering a sleep period, for an active period of $(i+1)^{th}$ discontinuous reception, a direction of the receive beam b of the terminal changes, and when a signal is received by using the receive beam b, signal quality for receiving a message by the terminal from the gNB may be greatly reduced.

In addition, in a high frequency scenario of 5G, a communication operating frequency band is about 28G to 39G, and a diffraction capability of an electromagnetic wave is reduced compared with a diffraction capability of an electromagnetic wave on a 3G frequency band. As shown in FIG. 1-6, if the terminal uses a receive beam b in an active period of $i^{th}$ discontinuous reception, and a signal quality value reaches a maximum, but moves in a sleep period, the signal quality value of the receive beam b decreases in an active period of $(i+1)^{th}$ discontinuous reception. As a result, signal quality for receiving a message by the terminal from the gNB may be greatly reduced.

It should be understood that, when a motion state changes or the communication environment around the terminal changes, if the terminal receives a paging message by using an optimal receive beam previously determined by the terminal motion state, signal quality of a corresponding received signal may be poor. This may cause a failure in receiving the paging message. After the terminal enters an active period, an optimal receive beam of the terminal is re-determined, and a paging signal is received by using the re-determined optimal receive beam, so that corresponding signal quality is the best. This reduces a risk of a failure in receiving the paging message.

Therefore, embodiments provide a discontinuous reception solution, including a discontinuous reception method and apparatus, and a system. The apparatus is configured to enter, based on a change in a motion state of a terminal or a change in received signal quality, an active period in advance before a sleep period indicated by a network ends.

In the embodiments, the following several example implementations for entering an active period in advance are provided. For example, specific duration for entering the active period in advance may be determined by using two factors: sensing information and historical signal quality information. The following separately describes two embodiments. Embodiment 1 is an implementation of determining the specific duration for entering the active period in advance by using the sensing information, and Embodiment 2 is an implementation of determining the specific duration for entering the active period in advance based on the historical signal quality information.

Embodiment 1: Refer to FIG. 2-1. This embodiment provides a discontinuous reception method, used to enter, based on sensing information, an active period of discontinuous reception in advance before a sleep period indicated by a downlink message ends, where discontinuous reception includes the sleep period and the active period that are of a terminal and that are indicated by a network. The method includes the following steps.

201: Determine, based on a motion state of the terminal, duration for waking up the terminal in advance.

In this embodiment, motion state information is from a sensor coupled to a receiving unit. As shown in FIG. 2-2, the terminal includes a baseband processor and a microprocessor. The microprocessor may also be referred to as a coprocessor, referred to as a low-power microprocessor, or referred to as a microprocessing unit, or may refer to a sensor hub in the embodiments. During physical implementation, the microprocessor may be integrated into a SoC chip, or may not be integrated into the SoC chip.

The baseband processor enters a sleep state when the terminal enters the sleep period of discontinuous reception, but the microprocessor is still in a working state when the terminal enters the sleep period of discontinuous reception. The microprocessor includes a timer and a sensor. In this embodiment, the terminal obtains the motion state information by using the built-in sensor.

As described above, if the terminal rotates or moves in the sleep period, signal quality may be reduced. In this case, the sensing information may include a moving distance and a rotation angle.

It should be understood that sensing information of the sensor may be motion state information of the terminal obtained by the sensor through measurement, for example, a rotation angle obtained by a gyroscope through measurement. A first processing unit may determine the motion state of the terminal based on the foregoing information. Alternatively, the motion state information may be indication information obtained by the sensor through further calculation based on motion state information of the terminal obtained through measurement, and the indication information may be used to indicate the motion state of the terminal. For example, a high level indicates a first motion state, a low level indicates a second motion state, and a zero level indicates that the motion state does not change.

The following separately describes examples in which the sensing information is a rotation angle or a displacement distance.

1. Rotation Angle

A first rotation angle and a second rotation angle are preset, where the first rotation angle is greater than the second rotation angle, for example, the first rotation angle is 60°, and the second rotation angle is 30°. If the rotation angle of the terminal in the sleep period exceeds 60°, a first motion state is determined. If the rotation angle of the terminal in the sleep period exceeds 30° and does not exceed 60°, a second motion state is determined.

The rotation may be understood as horizontal rotation, or may be expanded to a vertical flip.

2. Displacement Distance

A first displacement distance and a second displacement distance are preset, where the first displacement distance is greater than the second displacement distance, for example, the first displacement distance is 10 meters, and the second displacement distance is 5 meters. If the displacement distance of the terminal in the sleep period exceeds 10 meters, a first motion state is determined. If the displacement distance of the terminal in the sleep period exceeds 5 meters but does not exceed 10 meters, a second motion state is determined.

If the terminal neither belongs to the first motion state nor belongs to the second motion state, it may be considered that the motion state of the terminal does not change.

In this embodiment, if signal quality of the terminal in the sleep period does not change, the duration for waking up the terminal in advance is default duration Ta 0. Ta 0 is duration for waking up the terminal in advance determined by the terminal based on a signal quality status of the current environment and hardware configuration of the terminal. However, Ta 0 is only sufficient for the terminal to recover a receiving circuit. Because received signal quality of the terminal changes in the sleep period, the terminal needs additional duration to perform beam sweeping to determine an optimal receive beam. In this case, the additional duration is duration required for performing beam sweeping. The duration for waking up the terminal in advance is total duration of Ta 0 plus the additional duration.

It should be noted that the received signal quality of the terminal may be determined by obtaining one or more of a signal to noise ratio (SNR), a signal to interference plus noise ratio (SINR), received signal code power (RSCP), reference signal received power (RSRP), a received signal strength indicator (RSSI), and reference signal received quality (RSRQ). This is not limited herein.

The beam sweeping includes global sweeping or neighborhood sweeping. The global sweeping may be understood as re-determining the optimal receive beam from all receive beams of the terminal within the duration by which the terminal enters the active period in advance. The neighborhood sweeping may be understood as re-determining, within the duration by which the terminal enters the active period in advance, the optimal receive beam from receive beams adjacent to an optimal receive beam previously determined by the terminal.

A scenario shown in FIG. 2-3 is used as an example. There are eight receive beams of the terminal. It is assumed that it takes 10 milliseconds (ms) to sweep each receive beam. The global sweeping requires beam sweeping on the eight receive beams, and duration of at least 80 ms is required. If the neighborhood sweeping is to sweep one receive beam on each of the left and right sides of a receive beam b, beam sweeping on two receive beams may be performed, and duration of 20 ms is required.

It should be understood that historical signal quality information of the terminal may correspond to different cases. When the historical signal quality of the terminal is very poor, the optimal receive beam may be determined from all receive beams of the terminal. When the historical signal quality of the terminal is poor or average, the optimal receive beam may be re-determined from receive beams adjacent to the optimal receive beam previously determined by the terminal. According to the foregoing solution, different duration for entering the active period in advance is adaptively selected based on different historical signal quality information of the terminal. This can improve receive quality or a receive success rate of the paging signal, and reduce power consumption.

It should be noted that, if it is determined that the terminal needs to perform global sweeping, the additional duration includes duration required for global sweeping. If it is determined that the terminal needs to perform neighborhood sweeping, the additional duration includes duration required for neighborhood sweeping. If it is determined that beam sweeping does not need to be performed, the additional duration is 0 or the additional duration does not include beam sweeping duration.

The following describes a calculation method for the duration required for neighborhood sweeping and global sweeping.

It is assumed that Ta(n_Sweeping) is the duration required for neighborhood sweeping, a quantity of receive beams on which beam sweeping needs to be performed in the neighborhood sweeping is k, Ta(g_Sweeping) is the duration required for global sweeping, a quantity of receive beams on which beam sweeping needs to be performed in the global sweeping is m, and duration required for sweeping each receive beam is Ty. In this case, Ta(n_Sweeping) requires at least duration of k*Ty, and Ta(g_Sweeping) requires at least duration of m*Ty. It may be understood that m is greater than k, and Ta(g_Sweeping) is greater than Ta(n_Sweeping).

Figures 1, 2, 3, 4:
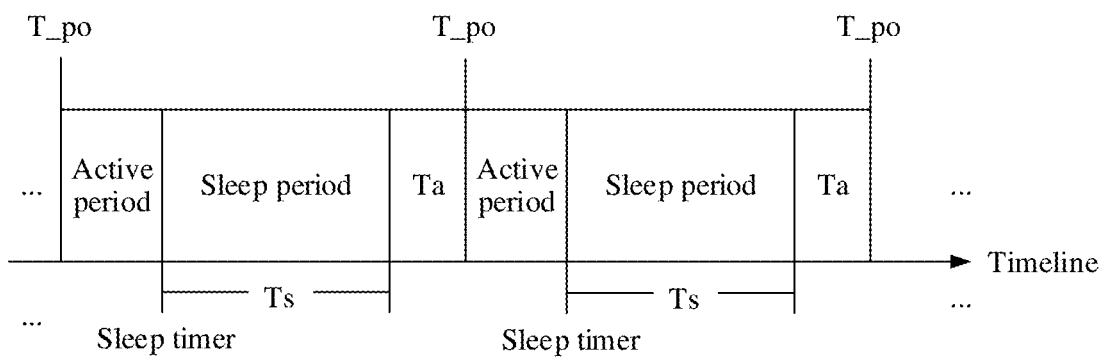

It should be noted that the terminal performs beam sweeping based on a primary synchronization/secondary synchronization/PBCH block (PSS/SSS PBCH block, SSB) delivered by a gNB, as shown in FIG. 2-4 (a schematic diagram of a structure of a synchronization signal block). In a 5G communication system, a primary synchronization signal, a secondary synchronization signal, and a physical broadcast channel together form an SSB. One SSB occupies a total of four orthogonal frequency division multiplexing (OFDM) symbols in time domain, and occupies a total of 240 consecutive subcarriers in frequency domain, namely, 20 physical resource blocks (physical resource blocks). A subcarrier spacing of the SSB may be one of 15 kilohertz (KHz), 30 kHz, 120 kHz, and 240 kHz. 15 KHz and 30 KHz are used for a frequency band below 6 gigahertz (GHz), and 120 KHz and 240 KHz are used for a frequency band above 6 GHz.

FIG. 2-5 is a schematic diagram of a structure of a synchronization signal burst set according to an embodiment. As shown in the upper part of FIG. 2-5, a synchronization signal burst set (SS burst set) may include a maximum of L (L≥1) SSBs, and the synchronization signal burst set may be periodically transmitted. A value of L is related to a frequency band. In a frequency band below 6 GHz, a maximum value of L may be 8. In a frequency band above 6 GHz, a maximum value of L may be 64. An SSB in a synchronization signal burst set should be transmitted within a window duration of 5 ms. In an initial camping phase, the synchronization signal burst set is transmitted based on a default synchronization signal burst set period (default SS burst set period). Generally, an SSB period may be 20 ms by default.

As shown in the lower part of FIG. 2-5, a wireless network device may sequentially transmit SSBs with different numbers in a transmission period of the synchronization signal burst set by using different transmit beam directions, or may sequentially transmit SSBs with a same number in a transmission period of the synchronization signal burst set by using a same transmit beam direction. It should be understood that the synchronization signal blocks with different numbers in this embodiment may further support transmit beam sweeping in different directions. In the frequency band below 6 GHz, a base station is enabled to support sweeping on a maximum of eight transmit beams, and in the frequency band above 6 GHz, the base station is enabled to support sweeping on a maximum of 64 transmit beams.

SSB signal strengths received by a terminal through different beam pair links may be different. To select an optimal receive beam or an optimal beam pair link, the terminal receives a downlink signal by using a corresponding receive beam, to ensure received signal quality. A terminal in an idle mode or in an inactive mode receives and measures a corresponding SSB in a predetermined manner within specific duration and determines the optimal receive beam based on a measurement result corresponding to each receive beam or each beam pair link.

An example is provided with reference to FIG. 1-1. For downlink, the terminal may configure a receive beam a, a receive beam b, and a receive beam c to sequentially receive different SSBs in at least three synchronization signal burst sets periodically sent by the base station, and measure an SSB received by each receive beam. If each synchronization signal burst set has L SSBs, each receive beam corresponds to a maximum of L SSB measurement results. The optimal receive beam is determined based on a corresponding measurement result (for example, a signal to interference plus noise ratio).

In some possible implementations, configurable values of window duration in the SSB period include: 5, 10, 20, 40, 80, and 160 (unit: ms). For example, if a selected configuration value of an SSB period is 10 ms, window duration of the SSB is 5 ms, and non-window duration is 5 ms. In this case, duration Tssb of the SSB period is 10 ms. Because the terminal can perform beam sweeping only in the window duration of the SSB period, as shown in FIG. 2-6 (a schematic diagram of the SSB period), duration required for domain sweeping is window duration in k SSB periods, that is, k*5 ms. However, because non-window duration cannot be skipped, duration of complete SSB periods, that is, k*Tssb, needs to be calculated. Non-window duration in the last SSB period is not required, and only window duration in the last SSB period is required. Therefore, the duration for neighborhood sweeping is duration of k−1 complete SSB periods plus the duration of the window duration in the last SSB period, and the following is obtained:

$$Tssb*(k-1)+5 \text{ ms}$$

In addition, because a current moment is not necessarily a start time point of the window duration of the SSB period, and beam sweeping can only be performed at the start time point of the window duration of the SSB period, a time difference ΔT from a current moment to the start time point of a window duration of a nearest subsequent SSB period also needs to be calculated. The duration required for neighborhood sweeping is finally determined as:

$$Ta(n\_sweeping)=Tssb*(k-1)+5 \text{ ms}+\Delta T$$

Generally, if it may be assumed that a selected configuration value is X, the duration required for neighborhood sweeping is finally determined as:

$$Ta(n\_sweeping)=Tssb*(k-1)+X+\Delta T$$

Similarly, it can be understood that the duration required for global sweeping is determined as:

$$Ta(g\_sweeping)=Tssb*(m-1)+X+\Delta T$$

For example, Tssb is equal to 10 ms, a quantity of beams on which neighborhood sweeping needs to be performed is 2, and the duration X of the window duration of the SSB period is equal to 5 ms. In addition, the time difference ΔT between the current moment and the start time point of the window duration of the subsequent SSB period is 1 ms. In this case, $$Ta(n\_sweeping) =$$
$$Tssb*(k-1)+X+\Delta T = 10*(2-1)+5\text{ ms}+1\text{ ms} = 16\text{ ms}$$

If a quantity of beams on which global sweeping needs to be performed is 8, perform:

$$Ta(g\_sweeping) =$$
$$Tssb*(m-1)+X+\Delta T = 10*(8-1)+5\text{ ms}+1\text{ ms} = 76\text{ ms}$$

Through the foregoing calculation, the duration Ta(n_sweeping) required for neighborhood sweeping and the duration Ta(g_sweeping) required for global sweeping are obtained. Total duration for global sweeping, total duration for neighborhood sweeping, and total duration without beam sweeping is Ta 1, Ta 2, and Ta 3 respectively:

$$Ta1=Ta0+Ta(g\_sweeping)$$

$$Ta2=Ta0+Ta(n\_sweeping)$$

$$Ta3=Ta0$$

In this way, the duration required for neighborhood sweeping, the duration required for global sweeping, or the duration without beam sweeping is separately obtained through calculation.

In some possible implementations, when the terminal is in a first motion state, the duration for waking up the terminal in advance is determined as first duration; or when the terminal is in a second motion state, the duration for waking up the terminal in advance is determined as second duration. The first duration is different from the second duration.

It should be understood that different duration for entering the active period in advance is determined based on different motion states of the terminal. For example, if the motion state of the terminal changes greatly, the terminal may enter the active period earlier, to re-determine the optimal receive beam or re-configure a circuit. According to the foregoing solution, different duration for entering the active period in advance is adaptively selected based on different motion states of the terminal. This can improve receive quality or a receive success rate of the paging signal, and reduce power consumption.

The first duration is the duration required for global sweeping, and the second duration is the duration required for neighborhood sweeping.

If the terminal is in the first motion state, it is determined that global sweeping needs to be performed, and the total duration may be determined as:

$$Ta=Ta0+Ta(g\_sweeping)$$

If the terminal is in the second motion state, and it is determined that neighborhood sweeping needs to be performed, the total duration is:

$$Ta=Ta0+Ta(n\_sweeping)$$

If it is determined that beam sweeping does not need to be performed, the total duration is:

$$Ta=Ta0$$

For example, default duration is 10 ms, the duration required for neighborhood sweeping is 16 ms, and the duration required for global sweeping is 76 ms. If it is determined that global sweeping needs to be performed, the total duration is:

$$Ta=Ta0+Ta(g\_sweeping)=10\text{ ms}+76\text{ ms}=86\text{ ms}$$

If it is determined that neighborhood sweeping needs to be performed, the total duration is:

$$Ta=Ta0+Ta(n\_sweeping)=10\text{ ms}+16\text{ ms}=26\text{ ms}$$

The duration for waking up the terminal in advance may be determined by using the foregoing calculation method.

202: The terminal enters the active period in advance by the duration before the sleep period indicated by the network ends.

In this embodiment, after the total duration for waking up the terminal in advance is determined, the timer may be set based on the total duration.

It should be noted that, if signal quality of an environment in which the terminal enters the sleep period remains unchanged, Ta 0 may be used as total duration Ta, and then sleep duration Ts is determined based on Ta 0. For example, as shown in FIG. 2-7, before entering the sleep period, the terminal obtains a current time point T_c, and then calculates the sleep duration Ts:

$$Ts=T\_po-T\_c-Ta$$

T_po−T_c indicates duration from a start time point of a PO to the current time point, and Ta indicates the total duration. It is assumed that signal quality of the environment in which the terminal enters the sleep period remains unchanged. Therefore, Ta 0 may be used as the total duration Ta, that is, Ta is equal to Ta 0, and T_po−T_c−Ta indicates the sleep duration. Finally, Ts is configured on the timer, and the terminal enters the sleep period. When Ts ends, the terminal exits the sleep period. When the terminal exits the sleep period, the terminal has duration of Ta 0 before T_po, for recovering a receiving circuit. It should be noted that the timer may be a function of a chip, that is, implemented by software, or may be a hardware entity in the terminal or the chip. This is not limited herein.

For example, if T_c is 16:43:00, a start time point T_po of a next PO (namely, a start time point of an active period of $(i+1)^{th}$ discontinuous reception) is 16:43:00.640 (or 16:43:01.280, where a commonly used discontinuous cycle is 640 ms, 1280 ms, or the like, and 640 ms is used as an example herein). In this case, T_po−T_c is equal to 640 ms. If Ta is equal to 10 ms, Ts is equal to T_po−T_c−Ta, that is, equal to 630 ms. In other words, before entering the sleep period, the terminal may set duration of the timer to 630 ms.

It should be noted that, if signal quality of the environment in which the terminal enters the sleep period changes, additional duration may be added to Ta 0, to obtain the total duration Ta, and then the sleep duration Ts is determined based on Ta.

As shown in FIG. 2-8 (a schematic diagram of calculating additional advance wake-up duration), in this embodiment, sleep duration Ts of the terminal in a current DRX cycle is obtained by subtracting total advance wake-up duration (including Ta 0 and the additional advance wake-up duration) from a time difference (T_c−T_po) between a time point before the terminal enters the sleep period (that is, a current moment T_c) and T_po of a next DRX cycle.

That is, calculate:

$$Ts = T\_po - T\_c - Ta$$

For example, if T_c is 19:29:00, T_po is 19:29:00.640, and Ta is equal to 86 ms, in this case, $$Ts = T\_po - T\_c - Ta = 640 \text{ ms} - 86 \text{ ms} = 554 \text{ ms}$$

Finally, the value of Ts is configured on the timer, so that the terminal enters the sleep period. In this way, the terminal enters the sleep period, and after Ts ends, the terminal exits the sleep period. In this case, duration before a next T_po is Ta, so that the terminal has sufficient time to recover the receiving circuit (using Ta 0), and perform global sweeping or neighborhood sweeping (using the additional advance wake-up duration) when necessary (when the signal quality is poor).

In some possible implementations, because it is not determined that global sweeping or neighborhood sweeping needs to be performed, or beam sweeping does not need to be performed, the terminal may separately set a plurality of timers before entering the sleep period, and then determine, by using motion information, a timer that needs to be enabled. As shown in FIG. 2-9 (which is a schematic diagram of setting a plurality of timers), the terminal sets three timers, where duration of the three timers are Ts 1, Ts 2, and Ts 3, and the terminal may enter the sleep period.

When global sweeping or neighborhood sweeping needs to be performed, or beam sweeping does not need to be performed, sleep duration is Ts 1, Ts 2, or Ts 3:

$$Ts1 = T\_po - T\_c - Ta1$$

$$Ts2 = T\_po - T\_c - Ta2$$

$$Ts3 = T\_po - T\_c - Ta3$$

When global sweeping or neighborhood sweeping is performed, or beam sweeping is not performed, additional duration is Ta 1, Ta 2, or Ta 3:

$$Ta1 = Ta0 + Ta(g\_sweeping)$$

$$Ta2 = Ta0 + Ta(n\_sweeping)$$

$$Ta3 = Ta0$$

When the terminal is in the sleep period, if it is determined that global sweeping needs to be performed, a timer whose sleep duration is Ts 1 is used as the timer, and timers whose sleep duration is Ts 2 and Ts 3 are disabled. If it is determined that neighborhood sweeping needs to be performed, a timer whose sleep duration is Ts 2 is used as the timer, and timers whose sleep duration is Ts 1 and Ts 3 are disabled. If it is determined that beam sweeping does not need to be performed, a timer whose sleep duration is Ts 3 is used as the timer, and timers whose sleep duration is Ts 1 and Ts 2 are disabled.

It should be noted that, if the timer whose sleep duration is Ts 1 is not determined to be used as the timer when Ts 1 ends, it may be considered that global sweeping does not need to be performed, and the timer whose sleep duration is Ts 1 is disabled. Similarly, when the foregoing timer is disabled, if the timer whose sleep duration is Ts 2 is not determined to be used as the timer when Ts 2 ends, it may be considered that neighborhood sweeping does not need to be performed, and the timer whose sleep duration is Ts 2 is disabled. If both the foregoing two timers are disabled, it may be considered that beam sweeping does not need to be performed, and the timer whose sleep duration is Ts 3 is used as the timer.

In some possible implementations, the timer may be set in another manner. For example, before the terminal enters the sleep period, a first timer whose duration is default duration is set, and then the terminal enters the sleep period. In the sleep period, the terminal obtains sensing information, and determines a motion state of the terminal based on the sensing information (a first motion state, a second motion state, or the motion state does not change) to determine whether beam sweeping needs to be performed; and if beam sweeping needs to be performed, determine whether to perform global sweeping or neighborhood sweeping.

As shown in FIG. 2-10, if global sweeping needs to be performed, set duration Ts(new) of the timer as:

$$Ts(new) = Ts(\text{time left}) - Ta(g\_sweeping)$$

If neighborhood sweeping needs to be performed, duration Ts(new) of the new timer is:

$$Ts(new) = Ts(\text{time left}) - Ta(n\_sweeping)$$

If neighborhood sweeping does not need to be performed, the new timer does not need to be set.

According to the foregoing timer setting method, a plurality of timers do not need to be set.

203: Re-determine an optimal receive beam within the duration by which the terminal enters the active period in advance, where the optimal receive beam is used to receive a paging message.

It should be understood that, when the motion state changes, if the terminal receives the paging message by using an optimal receive beam previously determined by the terminal, signal quality of a corresponding received signal may be poor. This may cause a failure in receiving the paging message. After the terminal enters an active period, an optimal receive beam of the terminal is re-determined, and a paging signal is received by using the re-determined optimal receive beam, so that corresponding signal quality is the best. This reduces a risk of a failure in receiving the paging message.

Further, in a possible implementation, the second processing unit is further configured to re-determine, within the duration by which the terminal enters the active period in advance, the optimal receive beam from receive beams adjacent to an optimal receive beam previously determined by the terminal.

It should be understood that, if the motion state of the terminal changes slightly, the optimal receive beam may be re-determined from the receive beams adjacent to the previously determined optimal receive beam. This reduces time for determining the optimal receive beam and reduces power consumption.

Further, in a possible implementation, the second processing unit is further configured to re-determine the optimal receive beam from all receive beams of the terminal within the duration by which the terminal enters the active period in advance.

It should be understood that, according to the foregoing solution, the optimal receive beam can be more accurately found, and receive quality or a receive success rate of the paging signal can be improved.

For example, refer to FIG. 1-1. Downlink is used as an example. A transmit beam set of a base station includes a transmit beam 1, a transmit beam 2, and a transmit beam 3. A receive beam set of a terminal includes a receive beam a, a receive beam b, and a receive beam c. The base station may sequentially transmit a signal by using the transmit beam 1 to the transmit beam 3 within a specific time interval, to cover a terminal in a specific area. The terminal may also sequentially receive, by using the receive beam a to the receive beam c within a specific time interval, the same signal repeatedly sent by using the foregoing different transmit beams, to determine an optimal receive beam from the receive beam set and determine an optimal beam pair link.

For example, there are eight receive beams formed by the terminal, as shown in FIG. 2-3 (which is a schematic diagram of a plurality of receive beams of the terminal), a receive beam a, a receive beam b, a receive beam c, a receive beam d, a receive beam e, a receive beam f, a receive beam g, and a receive beam h. The receive beam b is a beam aligned with a gNB in an active period of previous discontinuous reception, used to receive a paging message delivered by the gNB. Global sweeping is to sequentially perform beam sweeping on the eight receive beams, to determine a receive beam with best signal quality, and select the receive beam as a receive beam for receiving a paging message delivered by a gNB in an active period of next discontinuous reception. Neighborhood sweeping is to perform beam sweeping on the receive beam a and the receive beam c next to the receive beam b, or further perform beam sweeping on the receive beam h and the receive beam d in addition, to determine a receive beam with relatively good signal quality, and select the receive beam as a receive beam for receiving a paging message delivered by a gNB in an active period of next discontinuous reception. Generally, if it is determined that signal quality is poor, it may be considered that the receive beam b deviates greatly from a transmit beam of the gNB, so that global sweeping needs to be performed. If it is determined that signal quality is poor, it may be considered that the receive beam b deviates slightly from a transmit beam of the gNB, so that neighborhood sweeping may be used. If it is determined that signal quality is good, it may be considered that the receive beam b does not deviate from a transmit beam of the gNB, or the deviation is relatively small and can be ignored, so that beam sweeping may not be performed.

It should be understood that, when historical signal quality of the terminal is poor, it can be inferred that a current communication environment of the terminal changes. The paging signal is received by using a previously determined optimal receive beam, and corresponding signal quality may still be poor. This may cause a failure in receiving the paging message. After the terminal enters an active period, an optimal receive beam of the terminal is re-determined, and a paging signal is received by using the re-determined optimal receive beam, so that corresponding signal quality is the best. This reduces a risk of a failure in receiving the paging message.

Within the duration by which the terminal enters the active period in advance, the optimal receive beam is re-determined from receive beams adjacent to the optimal receive beam previously determined by the terminal.

It should be understood that historical signal quality information of the terminal may correspond to different cases. When the historical signal quality of the terminal is very poor, the optimal receive beam may be determined from all receive beams of the terminal. When the historical signal quality of the terminal is poor or average, the optimal receive beam may be re-determined from receive beams adjacent to the optimal receive beam previously determined by the terminal. According to the foregoing solution, different duration for entering the active period in advance is adaptively selected based on different historical signal quality information of the terminal. This can improve receive quality or a receive success rate of the paging signal, and reduce power consumption.

The optimal receive beam is re-determined from all receive beams of the terminal within the duration by which the terminal enters the active period in advance.

It should be understood that, according to the foregoing solution, the optimal receive beam can be more accurately found, and receive quality or a receive success rate of the paging signal can be improved.

The foregoing describes an implementation of determining the specific duration for entering the active period in advance by using the sensing information, and the following describes an implementation of determining the specific duration for entering the active period in advance based on the historical signal quality information.

Embodiment 2: Refer to FIG. 3. An embodiment provides a discontinuous reception method. The method includes the following steps.

301: Determine, based on historical signal quality information of a terminal, duration for waking up the terminal in advance.

In this embodiment, to cope with a case in which beam sweeping needs to be performed because signal quality of an environment in which the terminal is located changes greatly in a sleep process, in addition to default duration, the terminal requires additional duration. In this embodiment, the additional duration may be determined based on the historical signal quality information. The historical signal quality information is a set of signal quality collected in active periods of a plurality of DRX cycles of the terminal. For example, the historical signal quality information includes signal quality (SNRs) collected in active periods of five DRX cycles of the terminal, which is −86, −100, −89, −90, and −75 (unit: decibel-milliwatt (dBm)).

It should be understood that duration for entering an active period in advance may be further determined based on the historical signal quality information of the terminal, and a timer may be further set to wake up the terminal in advance. The timer may be a software timer, a hardware timer, or may be a timer combining software and hardware.

It should be understood that an apparatus for performing the foregoing steps may be a microprocessor or a SoC chip. It should be understood that, whether the terminal needs to be woken up in advance is determined based on the historical signal quality of the terminal. This reserves more preparation time, and reduces a probability of missing a paging message or failing to receive a paging message.

In this embodiment, the terminal may determine the signal quality based on the historical signal quality information, to determine to perform neighborhood sweeping, or global sweeping, or not to perform sweeping, and finally determine the additional duration. For example, one or more of the following plurality of factors may be used to determine that global sweeping or neighborhood sweeping needs to be performed, or determine not to perform sweeping.

1. Duration of a DRX Cycle

In some possible implementations, first preset duration and second preset duration may be preset, where the first preset duration (for example, two seconds) is longer than the second preset duration (for example, one second).

As shown in FIG. 2-2 (a schematic diagram of determining, based on the duration of the DRX cycle, whether beam sweeping needs to be performed), if the duration of the DRX cycle exceeds the first preset duration, it may be considered that there is a high probability that signal quality changes in a long enough time, and the signal quality may become poorer. In this case, it is determined that the terminal needs to perform global sweeping. If the duration of the DRX cycle does not exceed the first preset duration but exceeds the second preset duration, signal quality may change, but may not change greatly. In this case, it may be determined that neighborhood sweeping needs to be performed. If the duration of the DRX cycle does not exceed the second preset duration, it may be considered that signal quality does not change significantly in a short time. In this case, it is determined that beam sweeping does not need to be performed.

2. A Quantity of Signal Quality Information in the Historical Signal Quality Information In some possible implementations, a first preset quantity and a second preset quantity may be preset, where the first preset quantity (for example, 100) is greater than the second preset quantity (for example, 60).

As shown in FIG. 2-3 (a schematic diagram of determining, based on the quantity of signal quality information, whether beam sweeping needs to be performed), if the quantity of signal quality information in the signal quality historical information is less than the second preset quantity, it may be considered that the signal quality historical information does not have a sufficient quantity of information to determine whether signal quality of the environment in which the terminal is located is good, stable or not. In this case, the terminal may determine that global sweeping needs to be performed. If the quantity of signal quality information in the signal quality historical information is greater than the second preset quantity but less than the first preset quantity, it may be considered that although there is a specific quantity of information, it is still insufficient to determine whether signal quality of the environment in which the terminal is located is good, stable or not. In this case, the terminal may determine to perform neighborhood sweeping. If the quantity of signal quality information in the historical signal quality information is greater than the first preset quantity, it may be considered that there is a sufficient quantity of information to determine whether signal quality of the environment in which the terminal is located is good, stable or not. In this case, the terminal may determine not to perform beam sweeping.

3. A Signal Quality Variance in the Historical Signal Quality Information

In some possible implementations, if the historical signal quality information shows that the received signal quality of the terminal is stable, beam sweeping does not need to be performed. If received signal quality of the terminal is unstable, global sweeping or neighborhood sweeping needs to be performed. If received signal quality is very unstable, it is determined that global sweeping needs to be performed. The "stable" herein may be determined by the signal quality variance.

For example, a first preset variance and a second preset variance may be preset first, where the first preset variance (for example, 100) is greater than the second preset variance (for example, 60).

The signal quality variance of the received signal quality of the terminal in the historical signal quality information is calculated, as shown in FIG. 2-4 (a schematic diagram of determining, based on the signal quality variance, whether to perform beam sweeping). If the signal quality variance is greater than the first preset variance, it may be considered that the received signal quality of the terminal is very unstable. In this case, global sweeping needs to be performed. If the signal quality variance is greater than the second preset variance but less than the first preset variance, it may be considered that the received signal quality of the terminal is relatively unstable. In this case, neighborhood sweeping needs to be performed. If the signal quality variance is less than the second preset variance, it may be considered that the received signal quality of the terminal is relatively stable. In this case, beam sweeping does not need to be performed.

4. Determining by Using a Preset Average Value of Signal Quality in the Historical Received Signal Quality Information of the Terminal A first preset average value and a second preset average value are preset, where the first preset average value (for example, −70 dBM) is better than the second preset average value (for example, −90 dBM). The preset average value of signal quality in the historical received signal quality information of the terminal is calculated, as shown in FIG. 2-5 (a schematic diagram of determining, based on the average value of signal quality, whether beam sweeping needs to be performed). If the preset average value of signal quality is greater than the first preset average value, it may be determined that received signal quality of the terminal is good. In this case, beam sweeping does not need to be performed. If the preset average value of signal quality is less than the first preset average value and greater than the second preset average value, it may be determined that received signal quality of the terminal is mediocre. In this case, neighborhood sweeping needs to be performed. If the preset average value of the signal quality is less than the second preset average value, it may be determined that received signal quality of the terminal is poor. In this case, global sweeping needs to be performed.

One or more of the foregoing four determining manners may be used for determining. It should be noted that, in addition to the foregoing four manners, there may be another manner for determining whether global sweeping or neighborhood sweeping needs to be performed. This is not limited herein.

Optionally, the foregoing four manners may be simultaneously used for determining. If one of the determining manners determines to use the global sweeping, the global sweeping is used. If no determining manner determines to use the global sweeping, and at least one determining manner determines to use the neighborhood sweeping, the neighborhood sweeping is used. If all the four determining manners determine not to perform sweeping, it is determined that sweeping is not performed.

For example, a method for calculating duration required for neighborhood sweeping and global sweeping is the same as the calculation method in step 201, and total duration for global sweeping or neighborhood sweeping, or total duration without beam sweeping is also the same as the calculation method in step 201. Details are not described herein.

302: The terminal enters the active period in advance by the duration before a sleep period indicated by a network ends.

In this embodiment, after the total duration for waking up the terminal in advance is determined, and before entering the sleep period, the terminal may determine the sleep duration based on the total duration and set a timer that uses the sleep duration as duration of the timer.

For example, a method for calculating the sleep duration is the same as that in step 204. Details are not described herein again.

303: Re-determine an optimal receive beam within the duration by which the terminal enters the active period in advance, where the optimal receive beam is used to receive a paging message.

Step 303 is the same as step 203, and details are not described herein again.

The discontinuous reception solution provided in the embodiments is described above by using a method, and the following describes the discontinuous reception solution from a perspective of an apparatus, a terminal, and a system.

Refer to FIG. 4. An embodiment provides a discontinuous reception apparatus 400 for a terminal, where discontinuous reception includes a sleep period and an active period that are of the terminal and that are indicated by a network. The apparatus 400 includes:

- a receiving unit 401, configured to receive motion state information of the terminal, where the motion state information is used to indicate a motion state of the terminal; and
- a first processing unit 402, configured to determine, based on the motion state of the terminal, duration for waking up the terminal in advance, and enable the terminal to enter the active period in advance by the duration before the sleep period indicated by the network ends.

It should be understood that the apparatus may be a microprocessor or a SoC chip. For the microprocessor, the receiving unit is an input/output interface (for example, a chip pin of the microprocessor) of the microprocessor, and the first processing unit is a processor of the microprocessor. For the SoC chip, the receiving unit refers to an input/output interface of the SoC chip, and the first processing unit is a microprocessor in the SoC chip.

It should be understood that, whether the terminal needs to be woken up in advance is determined based on the motion state of the terminal. This reserves more preparation time, and reduces a probability of missing a paging message or failing to receive a paging message.

In a possible implementation, the apparatus 400 further includes:

- a second processing unit 403, configured to re-determine an optimal receive beam within the duration by which the terminal enters the active period in advance, where the optimal receive beam is used to receive a paging message.

It should be understood that, when the motion state changes, if the terminal receives the paging message by using an optimal receive beam previously determined by the terminal, signal quality of a corresponding received signal may be poor. This may cause a failure in receiving the paging message. After the terminal enters the active period, the optimal receive beam of the terminal is re-determined, and a paging signal is received by using the re-determined optimal receive beam, so that corresponding signal quality is the best. This reduces a risk of a failure in receiving the paging message.

Further, in a possible implementation, the second processing unit 403 is further configured to re-determine, within the duration by which the terminal enters the active period in advance, the optimal receive beam from receive beams adjacent to an optimal receive beam previously determined by the terminal.

It should be understood that, if the motion state of the terminal changes slightly, the optimal receive beam may be re-determined from the receive beams adjacent to the previously determined optimal receive beam. This reduces time for determining the optimal receive beam and reduces power consumption.

Further, in a possible implementation, the second processing unit 403 is further configured to re-determine the optimal receive beam from all receive beams of the terminal within the duration by which the terminal enters the active period in advance.

It should be understood that, according to the foregoing solution, the optimal receive beam can be more accurately found, and receive quality or a receive success rate of the paging signal can be improved.

In a possible implementation, when the terminal is in a first motion state, the duration for waking up the terminal in advance is determined as first duration; or when the terminal is in a second motion state, the duration for waking up the terminal in advance is determined as second duration. The first duration is different from the second duration.

It should be understood that the first processing unit 402 may determine, based on the motion state of the terminal, the duration for entering the active period in advance, and further set a timer to wake up the terminal in advance. The timer may be a software timer, a hardware timer, or may be a timer combining software and hardware.

In another possible implementation, the first processing unit 402 is further configured to: when the terminal is in a second motion state, determine the duration for waking up the terminal in advance as second duration. The second duration is different from the first duration.

It should be understood that different duration for entering the active period in advance is determined based on different motion states of the terminal. For example, if the motion state of the terminal changes greatly, the terminal may enter the active period earlier, to re-determine the optimal receive beam or re-configure a circuit. According to the foregoing solution, different duration for entering the active period in advance is adaptively selected based on different motion states of the terminal. This can improve receive quality or a receive success rate of the paging signal, and reduce power consumption.

In a possible implementation, the motion state information is from a sensor 404 coupled to the receiving unit 401.

It should be understood that sensing information of the sensor 404 may be motion state information of the terminal obtained by the sensor through measurement, for example, a rotation angle obtained by a gyroscope through measurement. The first processing unit may determine the motion state of the terminal based on the foregoing information.

Alternatively, sensing information of the sensor 404 may be indication information obtained by the sensor 404 through further calculation based on motion state information of the terminal obtained through measurement, and the indication information may be used to indicate the motion state of the terminal. For example, a high level indicates a first motion state, a low level indicates a second motion state, and a zero level indicates that the motion state does not change.

In a possible implementation, the first processing unit 402 is a microprocessor, and the first processing unit 402 is still in a working state when the terminal enters the sleep period of discontinuous reception.

In a possible implementation, the second processing unit 403 is a baseband processor, and the second processing unit 403 enters a sleep state when the terminal enters the sleep period of discontinuous reception.

In a possible implementation, the second processing unit 403 is further configured to determine, based on discontinuous reception configuration information delivered by the network, the sleep period and the active period that are of the terminal and that are indicated by the network.

In a possible implementation, the second processing unit 403 is further configured to determine, based on a system information block delivered by the network, the sleep period and the active period that are of the terminal and that are indicated by the network.

Figures 1, 2, 3, 4, 5:
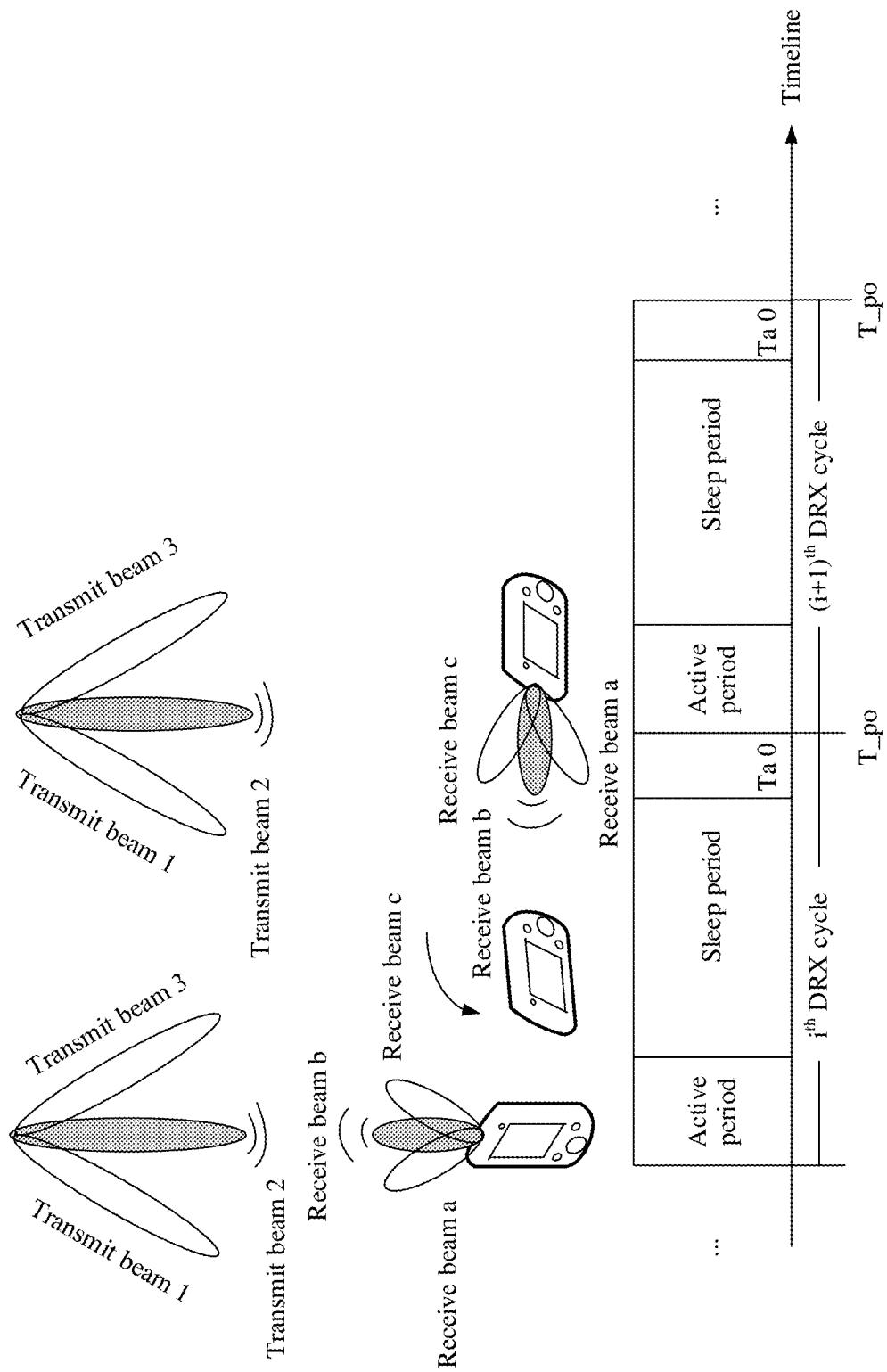

Refer to FIG. 5. An embodiment provides a discontinuous reception apparatus 500 for a terminal. The apparatus 500 includes:
- a first reading unit 501 configured to read historical signal quality information of the terminal; and
- a first processing unit 502 configured to determine, based on the historical signal quality information of the terminal, duration for waking up the terminal in advance, and enable the terminal to enter an active period in advance by the duration before a sleep period indicated by a network ends.

It should be understood that the apparatus 500 may be a microprocessor or a SoC chip. The first reading unit 501 may be configured to read received signal quality information of the terminal from an internal or external memory of the apparatus 500, where the memory may be located in the SoC chip or the baseband processor. For the microprocessor, the first reading unit 501 is an input/output interface (for example, a chip pin of the microprocessor) of the microprocessor, and the first processing unit 502 is a processor of the microprocessor. For the SoC chip, the first reading unit 501 is an input/output interface of the microprocessor, and the first processing unit 502 is a microprocessor in the SoC chip. It should be understood that, whether the terminal needs to be woken up in advance is determined based on the historical signal quality of the terminal. This reserves more preparation time, and reduces a probability of missing a paging message or failing to receive a paging message.

In a possible implementation, the apparatus 500 further includes:
- a second processing unit 503, configured to re-determine an optimal receive beam within the duration by which the terminal enters the active period in advance, where the optimal receive beam is used to receive a paging message.

It should be understood that, when historical signal quality of the terminal is poor, it can be inferred that a current communication environment of the terminal changes. The paging signal is received by using a previously determined optimal receive beam, and corresponding signal quality may still be poor. This may cause a failure in receiving the paging message. After the terminal enters the active period, the optimal receive beam of the terminal is re-determined, and a paging signal is received by using the re-determined optimal receive beam, so that corresponding signal quality is the best. This reduces a risk of a failure in receiving the paging message.

The second processing unit 503 is further configured to re-determine, within the duration by which the terminal enters the active period in advance, the optimal receive beam from receive beams adjacent to an optimal receive beam previously determined by the terminal.

It should be understood that the historical signal quality information of the terminal may correspond to different cases. When the historical signal quality of the terminal is very poor, the optimal receive beam may be determined from all receive beams of the terminal. When the historical signal quality of the terminal is poor or average, the optimal receive beam may be re-determined from receive beams adjacent to the optimal receive beam previously determined by the terminal. According to the foregoing solution, different duration for entering the active period in advance is adaptively selected based on different historical signal quality information of the terminal. This can improve receive quality or a receive success rate of the paging signal, and reduce power consumption.

In a possible implementation, the second processing unit 503 is further configured to re-determine the optimal receive beam from all receive beams of the terminal within the duration by which the terminal enters the active period in advance.

It should be understood that, according to the foregoing solution, the optimal receive beam can be more accurately found, and receive quality or a receive success rate of the paging signal can be improved.

It should be understood that the first processing unit 502 may determine, based on historical received signal quality information of the terminal, the duration for entering the active period in advance, and further set a timer to wake up the terminal in advance. The timer may be a software timer, a hardware timer, or may be a timer combining software and hardware.

In a possible implementation, the first processing unit 502 is a microprocessor, and the first processing unit 502 is still in a working state when the terminal enters the sleep period of discontinuous reception.

In a possible implementation, the second processing unit 503 is a baseband processor, and the second processing unit 503 enters a sleep state when the terminal enters the sleep period of discontinuous reception.

With reference to any one of the second aspect or the foregoing possible implementations of the second aspect, in a possible implementation, the second processing unit 503 is further configured to determine, based on discontinuous reception configuration information delivered by the network, the sleep period and the active period that are of the terminal and that are indicated by the network.

With reference to any one of the second aspect or the foregoing possible implementations of the second aspect, in a possible implementation, the second processing unit 503 is further configured to determine, based on a system information block delivered by the network, the sleep period and the active period that are of the terminal and that are indicated by the network.

Figures 1, 2, 3, 4, 5, 6:
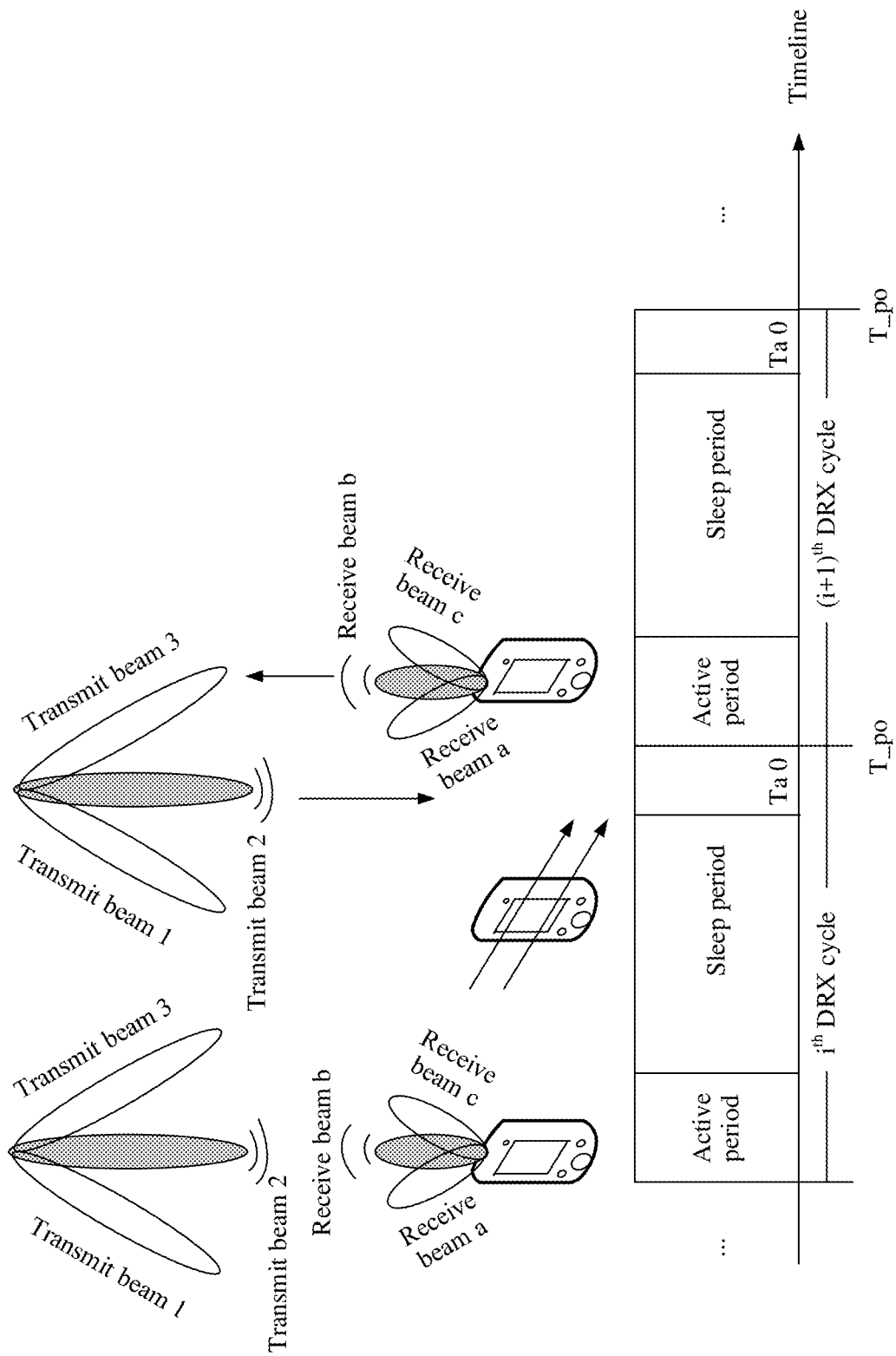

Refer to FIG. 6. An embodiment further provides a terminal 600. The terminal 600 includes:
- a baseband processor 601, configured to determine, based on a message from a network, a sleep period and an active period that are of the terminal 600 and that are indicated by the network;
- a sensor 602, configured to obtain motion state information of the terminal 600, where the motion state information is used to indicate a motion state of the terminal 600; and
- a microprocessor 603 coupled to the sensor 602 and the baseband processor 601, configured to determine, based on the motion state of the terminal 600, duration for waking up the terminal 600 in advance, and enable the terminal 600 to enter the active period in advance by the duration before the sleep period indicated by the network ends, where the microprocessor 603 is still in a working state when the terminal 600 enters the sleep period of discontinuous reception.

It should be understood that, whether the terminal 600 needs to be woken up in advance is determined based on the motion state of the terminal 600. This reserves more preparation time, and reduces a probability of missing a paging message or failing to receive a paging message.

It should be understood that sensing information of the sensor 602 may be motion state information of the terminal 600 obtained by the sensor 602 through measurement, for example, a rotation angle obtained by a gyroscope through measurement. The microprocessor 603 may determine the motion state of the terminal 600 based on the foregoing information.

Alternatively, sensing information of the sensor 602 may be indication information obtained by the sensor 602 through further calculation based on motion state information of the terminal 600 obtained through measurement, and the indication information may be used to indicate the motion state of the terminal 600. For example, a high level indicates a first motion state, a low level indicates a second motion state, and a zero level indicates that the motion state does not change.

In a possible implementation, the baseband processor 601 is further configured to re-determine an optimal receive beam within the duration by which the terminal 600 enters the active period in advance, where the optimal receive beam is used to receive a paging message. The baseband processor 601 enters a sleep state when the terminal 600 enters the sleep period of discontinuous reception.

It should be understood that, when the motion state changes, if the terminal 600 receives the paging message by using an optimal receive beam previously determined by the terminal 600, signal quality of a corresponding received signal may be poor. This may cause a failure in receiving the paging message. After the terminal 600 enters the active period, the optimal receive beam of the terminal 600 is re-determined, and a paging signal is received by using the re-determined optimal receive beam, so that corresponding signal quality is the best. This reduces a risk of a failure in receiving the paging message.

Further, in a possible implementation, the baseband processor 601 is further configured to re-determine, within the duration by which the terminal 600 enters the active period in advance, the optimal receive beam from receive beams adjacent to an optimal receive beam previously determined by the terminal 600.

It should be understood that, if the motion state of the terminal 600 changes slightly, the optimal receive beam may be re-determined from the receive beams adjacent to the previously determined optimal receive beam. This reduces time for determining the optimal receive beam and reduces power consumption.

Further, in a possible implementation, the baseband processor 601 is further configured to re-determine the optimal receive beam from all receive beams of the terminal 600 within the duration by which the terminal 600 enters the active period in advance.

It should be understood that, according to the foregoing solution, the optimal receive beam can be more accurately found, and receive quality or a receive success rate of the paging signal can be improved.

In a possible implementation, the microprocessor 603 is further configured to: when the terminal 600 is in a first motion state, determine the duration for waking up the terminal 600 in advance as first duration.

It should be understood that the microprocessor 603 may determine, based on the motion state of the terminal 600, the duration for entering the active period in advance, and further set a timer to wake up the terminal 600 in advance. The timer may be a software timer, a hardware timer, or may be a timer combining software and hardware. In another possible implementation, the microprocessor 603 is further configured to: when the terminal 600 is in a second motion state, determine the duration for waking up the terminal 600 in advance as second duration. The second duration is different from the first duration.

It should be understood that different duration for entering the active period in advance is determined based on different motion states of the terminal 600. For example, if the motion state of the terminal 600 changes greatly, the terminal 600 may enter the active period earlier, to re-determine the optimal receive beam or re-configure a circuit. According to the foregoing solution, different duration for entering the active period in advance is adaptively selected based on different motion states of the terminal 600. This can improve receive quality or a receive success rate of the paging signal, and reduce power consumption.

In a possible implementation, the baseband processor 601 is further configured to determine, based on discontinuous reception configuration information (DRX config) delivered by the network, the sleep period and the active period that are of the terminal 600 and that are indicated by the network.

In a possible implementation, the baseband processor 601 is further configured to determine, based on a system information block delivered by the network, the sleep period and the active period that are of the terminal 600 and that are indicated by the network.

Figures 1, 2:
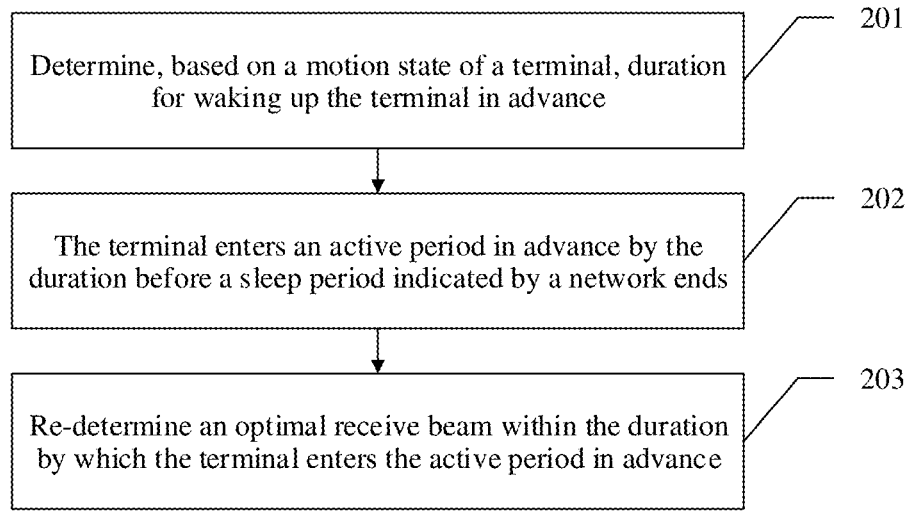
Figure 2:
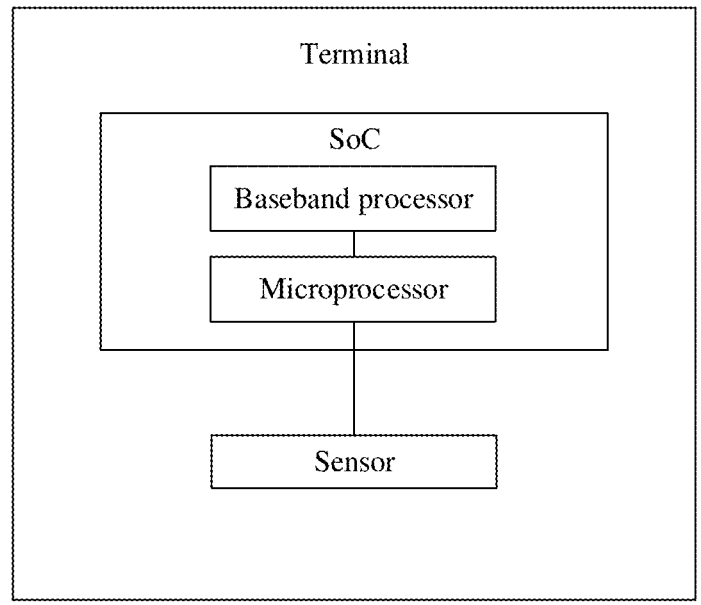
Figures 2, 3:
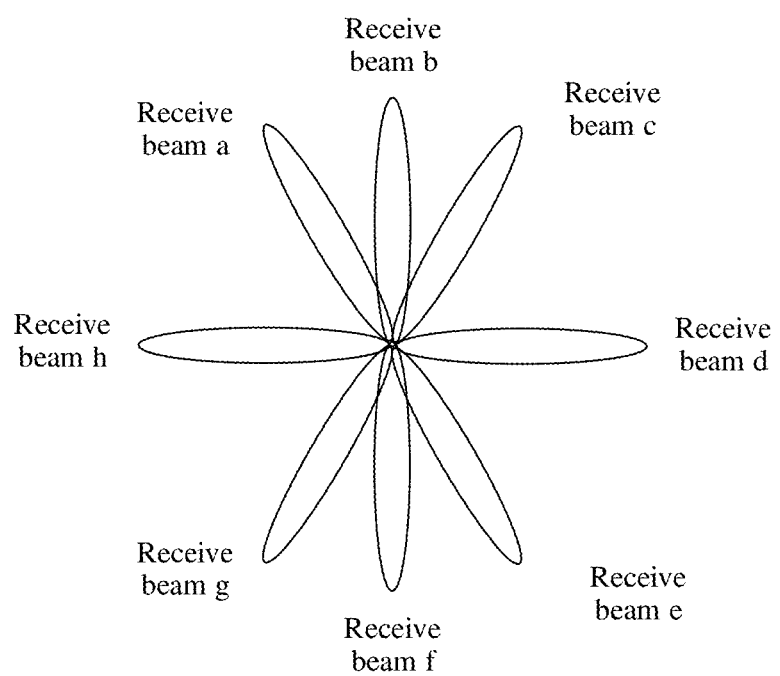
Figures 2, 3, 4:
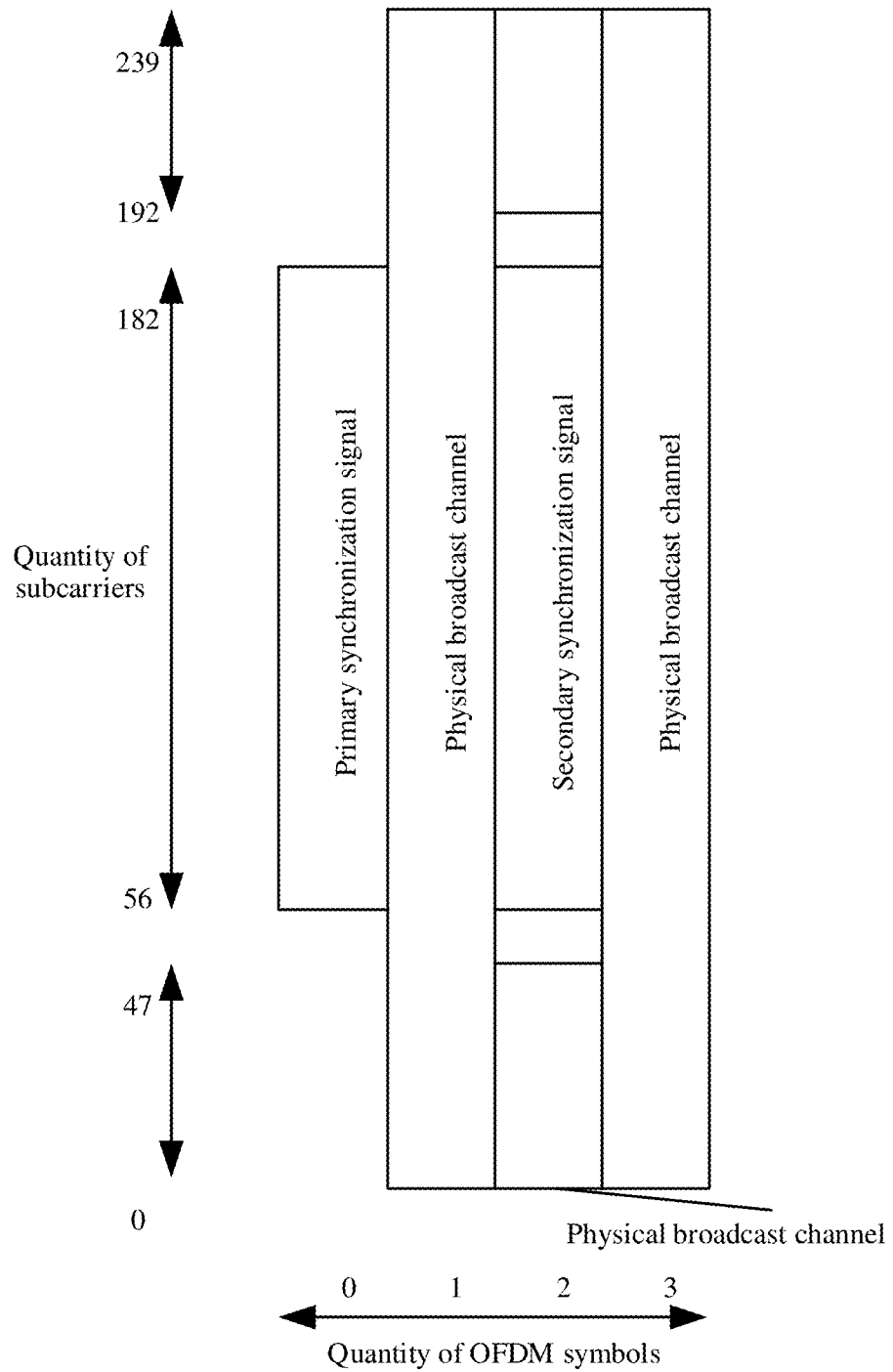
Figures 2, 3, 4, 5:
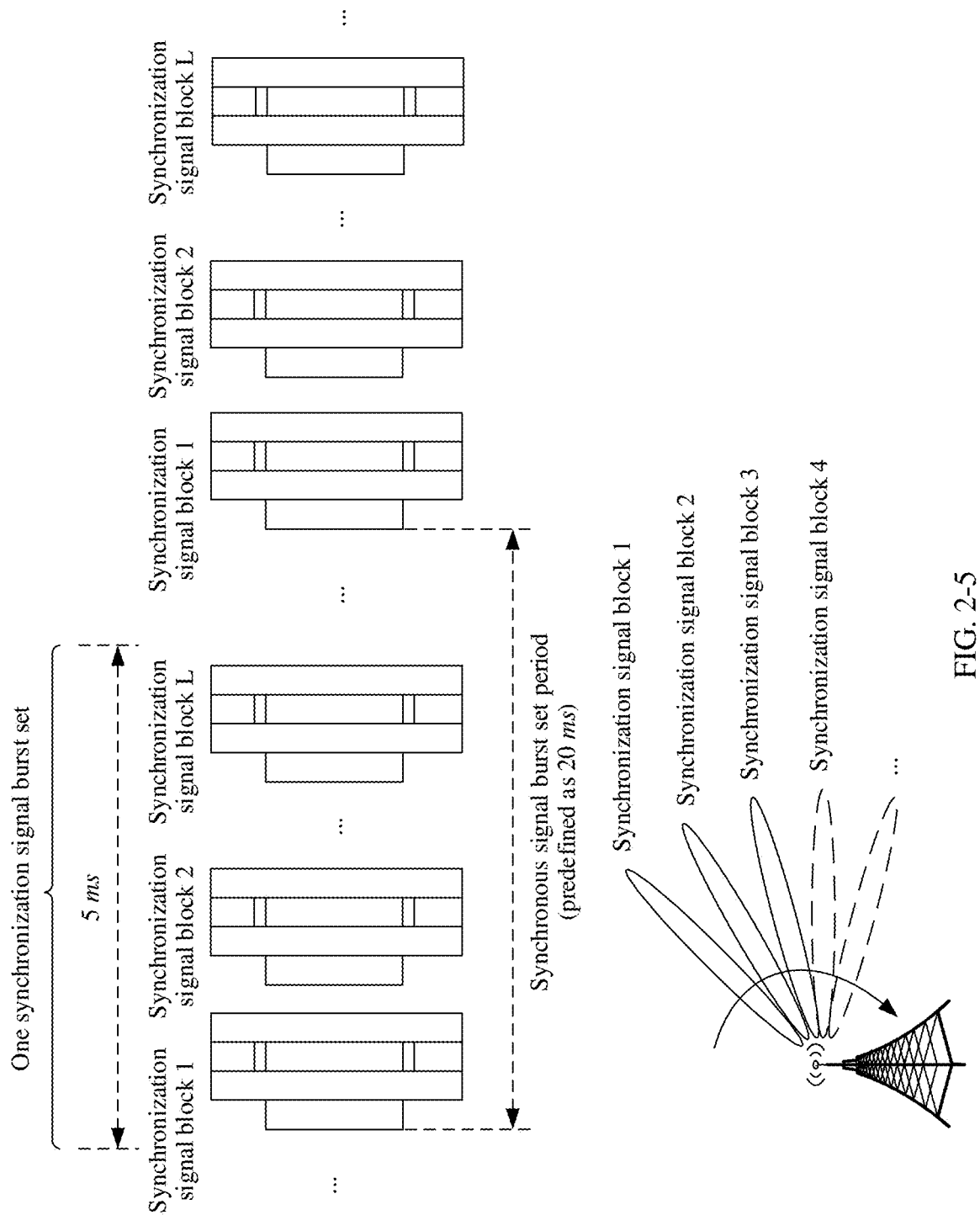
Figures 2, 3, 4, 5, 6:
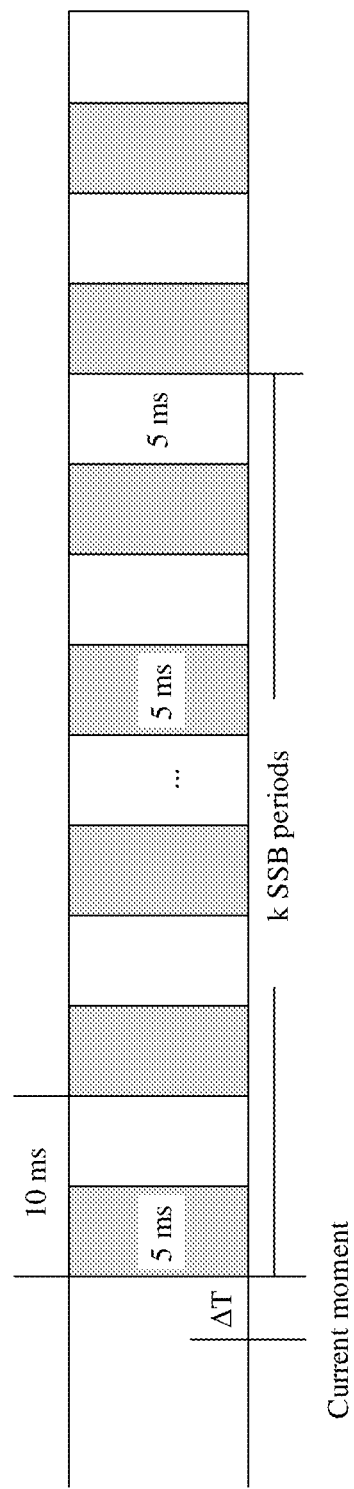
Figures 2, 3, 4, 5, 6, 7:
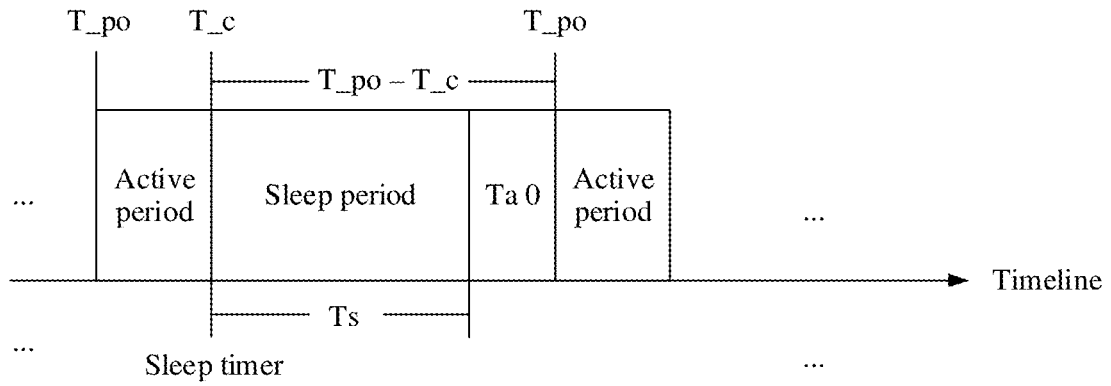

Refer to FIG. 7. An embodiment provides a terminal 700. The terminal 700 includes:
- a baseband processor 701, configured to read historical signal quality information of the terminal 700; and
- a microprocessor 702, configured to determine, based on the historical signal quality information of the terminal 700, duration for waking up the terminal 700 in advance, and enable the terminal 700 to enter an active period in advance by the duration before a sleep period indicated by a network ends.

It should be understood that the baseband processor 701 may be configured to read signal quality information of the terminal 700 from an internal or external memory of the terminal 700, where the memory may be located in the baseband processor 701. It should be understood that, whether the terminal 700 needs to be woken up in advance is determined based on the historical signal quality of the terminal 700. This reserves more preparation time, and reduces a probability of missing a paging message or failing to receive a paging message.

In a possible implementation, the baseband processor 701 is further configured to re-determine an optimal receive beam within the duration by which the terminal 700 enters the active period in advance, where the optimal receive beam is used to receive a paging message.

It should be understood that, when historical signal quality of the terminal 700 is poor, it can be inferred that a current communication environment of the terminal 700 changes. The paging signal is received by using a previously determined optimal receive beam, and corresponding signal quality may still be poor. This may cause a failure in receiving the paging message. After the terminal 700 enters the active period, the optimal receive beam of the terminal 700 is re-determined, and a paging signal is received by using the re-determined optimal receive beam, so that corresponding signal quality is the best. This reduces a risk of a failure in receiving the paging message.

In another possible implementation, the baseband processor 701 is further configured to re-determine, within the duration by which the terminal 700 enters the active period in advance, the optimal receive beam from receive beams adjacent to an optimal receive beam previously determined by the terminal 700.

It should be understood that the historical signal quality information of the terminal 700 may correspond to different cases. When the historical signal quality of the terminal 700 is very poor, the optimal receive beam may be determined from all receive beams of the terminal 700. When the historical signal quality of the terminal 700 is poor or average, the optimal receive beam may be re-determined from receive beams adjacent to the optimal receive beam previously determined by the terminal 700. According to the foregoing solution, different duration for entering the active period in advance is adaptively selected based on different historical signal quality information of the terminal 700. This can improve receive quality or a receive success rate of the paging signal, and reduce power consumption.

In a possible implementation, the baseband processor 701 is further configured to re-determine the optimal receive beam from all receive beams of the terminal 700 within the duration by which the terminal 700 enters the active period in advance.

It should be understood that, according to the foregoing solution, the optimal receive beam can be more accurately found, and receive quality or a receive success rate of the paging signal can be improved.

It should be understood that the microprocessor 702 may determine, based on the historical signal quality information of the terminal 700, the duration for entering the active period in advance, and further set a timer to wake up the terminal 700 in advance. The timer may be a software timer, a hardware timer, or may be a timer combining software and hardware.

In a possible implementation, the microprocessor 702 is further configured to remain in a working state when the terminal 700 enters the sleep period of discontinuous reception.

In a possible implementation, the baseband processor 701 is further configured to enter a sleep state when the terminal 700 enters the sleep period of discontinuous reception.

In a possible implementation, the baseband processor 701 is further configured to determine, based on discontinuous reception configuration message delivered by the network, the sleep period and the active period that are of the terminal 700 and that are indicated by the network.

In a possible implementation, the baseband processor 701 is further configured to determine, based on a system information block delivered by the network, the sleep period and the active period that are of the terminal 700 and that are indicated by the network.

Figures 2, 3, 4, 5, 6, 7, 8:
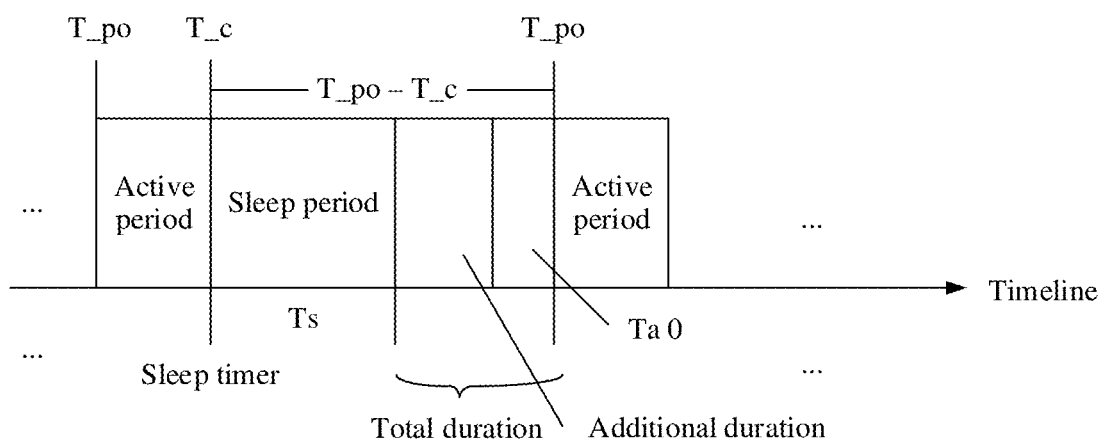
Figures 2, 3, 4, 5, 6, 7, 8, 9:
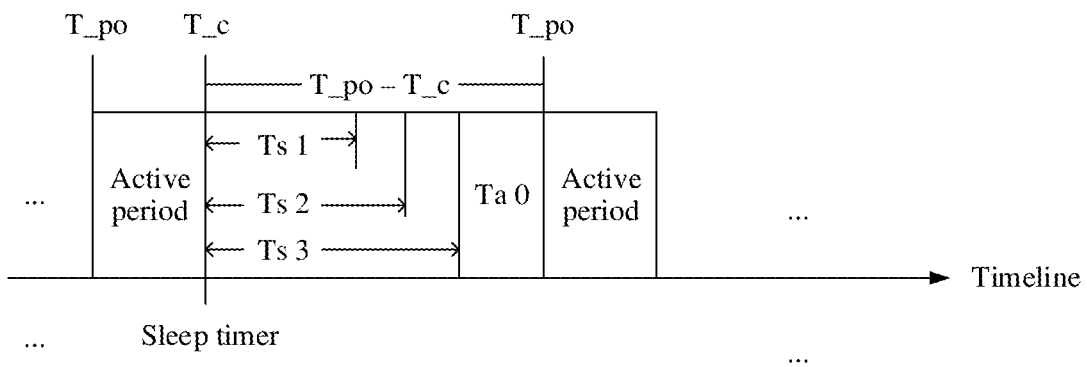
Figures 2, 3, 4, 5, 6, 7, 8, 9, 10:
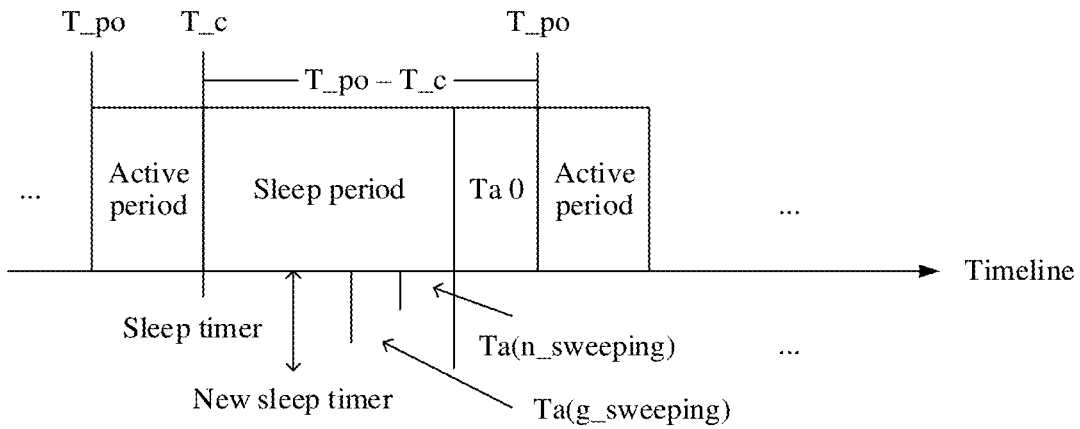
Figure 3:
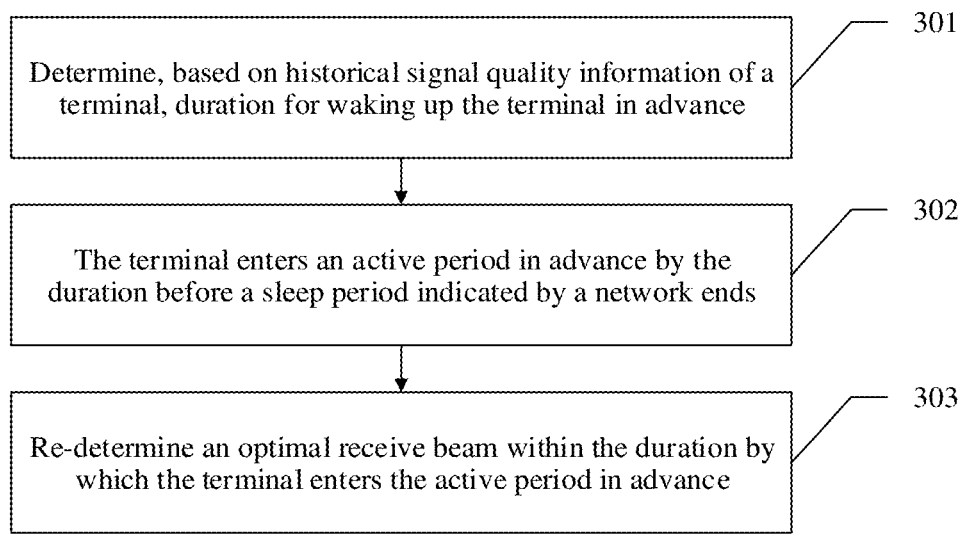
Figure 4:
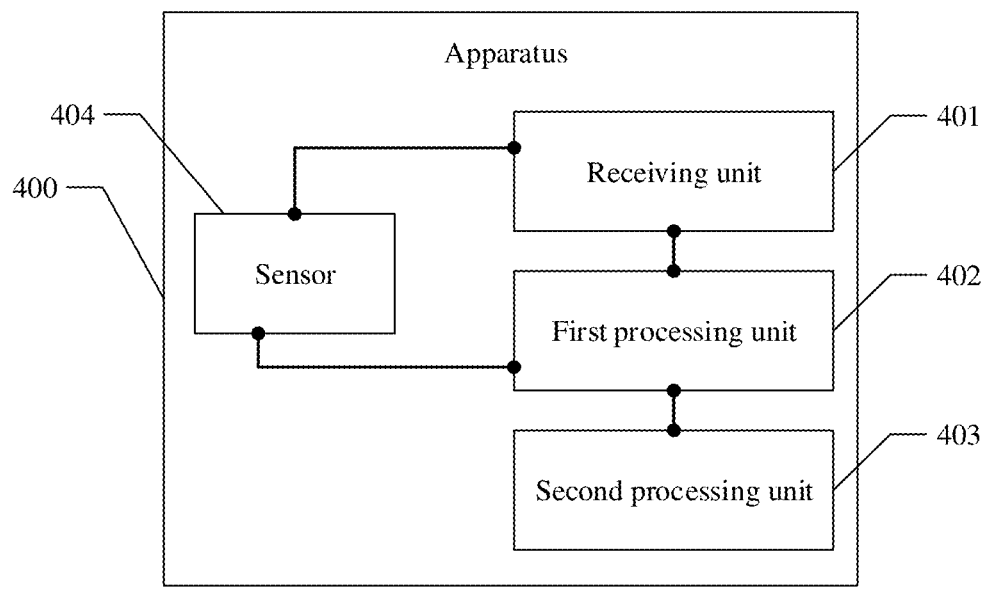
Figure 5:
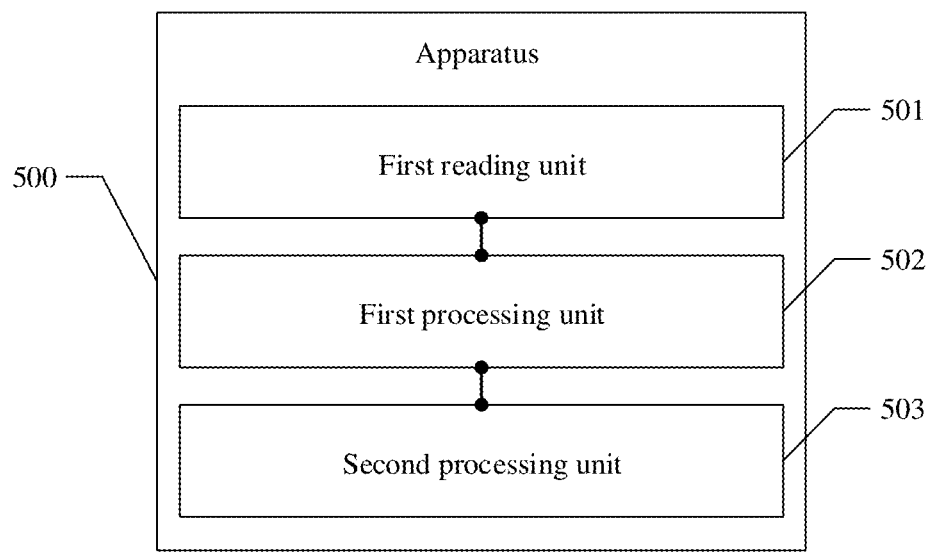
Figure 6:
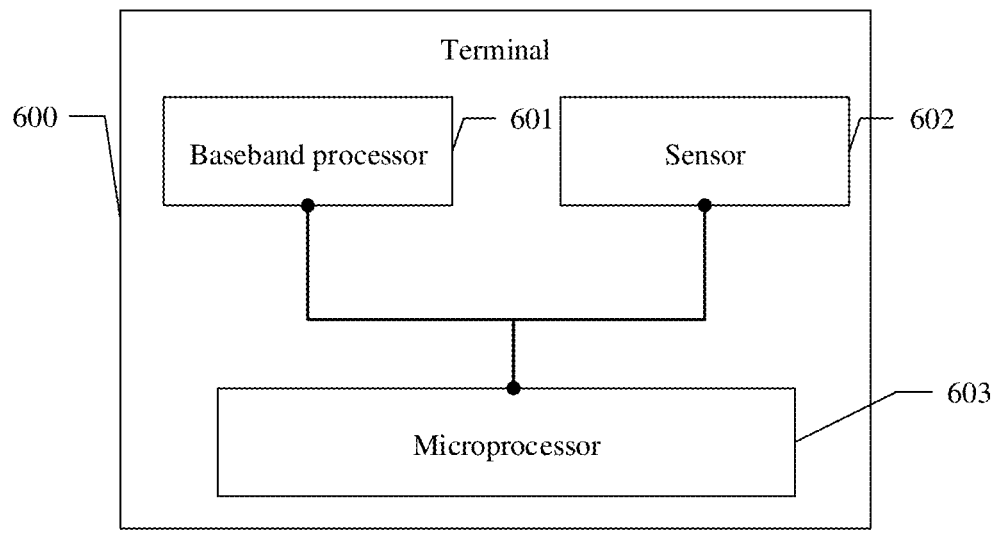
Figure 7:
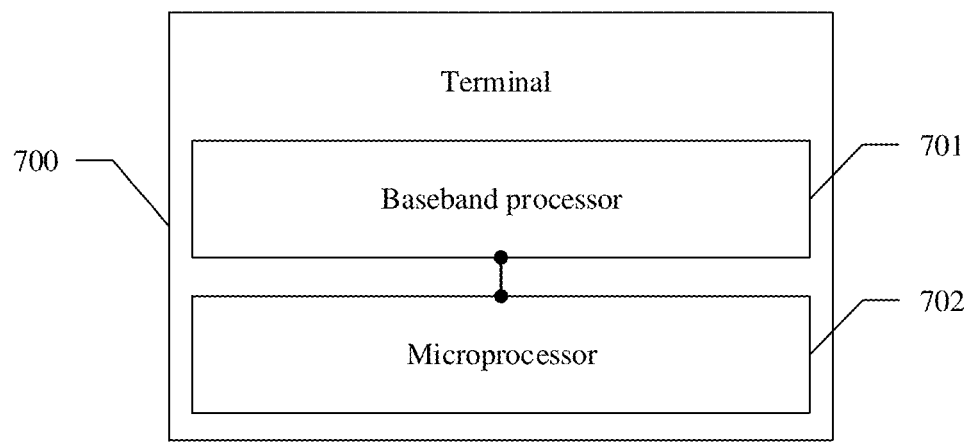
Figure 8:
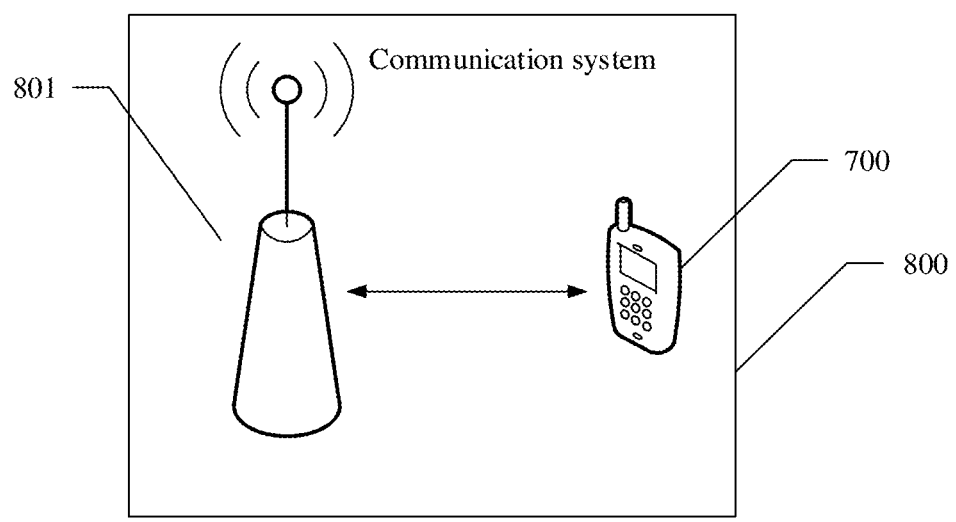

Refer to FIG. 8. An embodiment provides a communication system 800. The communication system 800 includes a wireless network device 801, and the terminal 600 or the terminal 700 in which the apparatus according to the foregoing implementations is located.

All or some of the foregoing embodiments may be implemented by using software, hardware, firmware, or any combination thereof. When software is used to implement the embodiments, the embodiments may be implemented all or partially in a form of a computer program product.

The computer program product includes one or more computer instructions. When the computer program instructions are loaded and executed on a computer, all or some of the procedures or the functions according to the embodiments are generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state disk Solid State Disk (SSD)), or the like.

What is claimed is:

1. An apparatus for a terminal, wherein discontinuous reception comprises a sleep period and an active period of the terminal that are indicated by a network, and the apparatus comprises:
 a receiving circuit configured to receive motion state information of the terminal, wherein the motion state information is used to indicate a motion state of the terminal;
 a first processing circuit configured to determine, based on the motion state of the terminal, a duration for entering the active period in advance and enable the terminal to enter the active period in advance by a duration before the sleep period indicated by the network ends; and
 a second processing circuit configured to redetermine an optimal receive beam within the duration for entering the active period in advance, wherein the duration for entering the active period in advance is adaptively selected based on different motion states of the terminal.

2. The apparatus according to claim 1, wherein the optimal receive beam is used to receive a paging message.

3. The apparatus according to claim 2, wherein the second processing circuit is further configured to re-determine, within the duration by which the terminal enters the active period in advance, the optimal receive beam from receive beams adjacent to an optimal receive beam previously determined by the terminal.

4. The apparatus according to claim 2, wherein the second processing circuit is further configured to re-determine the optimal receive beam from all receive beams of the terminal within the duration by which the terminal enters the active period in advance.

5. The apparatus according to claim 1, wherein the first processing circuit is further configured to:
 determine the duration for waking up the terminal in advance as first duration, when the terminal is in a first motion state; or
 determine the duration for waking up the terminal in advance as second duration, when the terminal is in a second motion state, wherein the first duration is different from the second duration.

6. The apparatus according to claim 1, wherein the first processing circuit is a microprocessor, and the first processing circuit is still in a working state when the terminal enters the sleep period of discontinuous reception.

7. The apparatus according to claim 2, wherein the second processing circuit is a baseband processor, and the second processing circuit enters a sleep state when the terminal enters the sleep period of discontinuous reception.

8. The apparatus according to claim 2, wherein the second processing circuit is further configured to determine, based on discontinuous reception configuration information delivered by the network, the sleep period and the active period that are of the terminal and that are indicated by the network.

9. The apparatus according to claim 2, wherein the second processing circuit is further configured to determine, based on a system information block delivered by the network, the sleep period and the active period that are of the terminal and that are indicated by the network.

10. A method, wherein discontinuous reception comprises a sleep period and an active period of a terminal that are indicated by a network, the method comprising:
    determining, based on a motion state of the terminal, a duration for entering the active period in advance;
    enabling the terminal to enter the active period in advance by a duration before the sleep period indicated by the network ends; and
    redetermining an optimal receive beam within the duration by which the terminal enters the active period in advance, wherein the duration for entering the active period in advance is adaptively selected based on different motion states of the terminal.

11. The method according to claim 10,
    wherein the optimal receive beam is used to receive a paging message.

12. The method according to claim 11, wherein the re-determining of the optimal receive beam within the duration by which the terminal enters the active period in advance further comprises:
    re-determining, within the duration by which the terminal enters the active period in advance, the optimal receive beam from receive beams adjacent to an optimal receive beam previously determined by the terminal.

13. The method according to claim 11, wherein the re-determining of the optimal receive beam within the duration by which the terminal enters the active period in advance further comprises:
    re-determining the optimal receive beam from all receive beams of the terminal within the duration by which the terminal enters the active period in advance.

14. The method according to claim 10, wherein determining, based on the motion state of the terminal, of the duration for waking up the terminal in advance further comprises:
    when the terminal is in a first motion state, determining the duration for waking up the terminal in advance as a first duration; or
    when the terminal is in a second motion state, determining the duration for waking up the terminal in advance as a second duration, wherein the first duration is different from the second duration.

15. The method according to claim 10, further comprising:
    determining, based on a discontinuous reception configuration message delivered by the network, the sleep period and the active period that are of the terminal and that are indicated by the network.

16. The method according to claim 10, further comprising:
    determining, based on a system information block delivered by the network, the sleep period and the active period that are of the terminal and that are indicated by the network.

17. A terminal comprising:
    a baseband processor configured to determine, based on a message from a network, a sleep period and an active period of the terminal that are indicated by the network;
    a sensor configured to obtain motion state information of the terminal, wherein the motion state information is used to indicate a motion state of the terminal; and
    a microprocessor coupled to the sensor and the baseband processor, the microprocessor configured to:
    determine, based on the motion state of the terminal, a duration for entering the active period in advance,
    redetermine an optimal receive beam within the duration by which the terminal enters the active period in advance, wherein the duration for entering the active period in advance is adaptively selected based on different motion states of the terminal, and
    enable the terminal to enter the active period in advance by a duration before the sleep period indicated by the network ends, wherein the microprocessor is still in a working state when the terminal enters the sleep period of discontinuous reception.

* * * * *